(12) United States Patent
Hada

(10) Patent No.: US 6,218,660 B1
(45) Date of Patent: Apr. 17, 2001

(54) IMAGE FORMING APPARATUS

(75) Inventor: Yoshinobu Hada, Aichi-Ken (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/289,673

(22) Filed: Apr. 12, 1999

(30) Foreign Application Priority Data

Apr. 14, 1998 (JP) .................................................. 10-102578

(51) Int. Cl.$^7$ ........................... G03G 15/00; G03G 15/14
(52) U.S. Cl. ........................... 250/226; 250/234; 347/116
(58) Field of Search .................................. 250/226, 234, 250/235, 236; 358/1.12, 300, 403, 450; 347/115, 116, 119; 399/9, 66, 130, 301, 302

(56) References Cited

U.S. PATENT DOCUMENTS

| | | | |
|---|---|---|---|
| 5,175,570 | * 12/1992 | Haneda et al. | 347/116 |
| 5,266,976 | * 11/1993 | Ohigashi et al. | 347/116 |
| 5,499,092 | * 3/1996 | Sasaki | 399/302 |
| 5,627,649 | * 5/1997 | Sawayama et al. | 358/403 |
| 5,729,353 | * 3/1998 | Sawayama et al. | 358/300 |
| 5,887,125 | * 3/1999 | Takano et al. | 358/1.12 |
| 6,137,981 | * 10/2000 | Janssens et al. | 399/301 |

FOREIGN PATENT DOCUMENTS 63-279273 11/1988 (JP) .
63-286866 11/1988 (JP) .

* cited by examiner

Primary Examiner—John R. Lee
(74) Attorney, Agent, or Firm—Burns, Doane, Swecker & Mathis, LLP

(57) ABSTRACT

A color image forming apparatus that forms color images by synthesizing multiple single-color images formed by multiple image forming units. The image forming apparatus forms resist marks using the multiple image forming units and detects the positions of the marks in order to determine the timing of the synthesis of the single-color images. In order to obtain the positions of the marks with accuracy, the size or darkness of the marks formed are determined such that the waveforms formed from the output signals from the sensor that detects the marks comprise peaked waveforms having a peak.

9 Claims, 20 Drawing Sheets

|   |   |      |   |     |
|---|---|------|---|-----|
| 0 | 0 | -1/4 | 0 | 0   |
| 0 | 0 | 0    | 0 | 0   |
| 1/4 | 0 | 1  | 0 | 1/4 |
| 0 | 0 | 0    | 0 | 0   |
| 0 | 0 | 1/4  | 0 | 0   |

Laplacian filter

Fig. 15 (a)

|   |      |     |      |   |
|---|------|-----|------|---|
| 0 | 0    | 0   | 0    | 0 |
| 0 | 1/16 | 1/8 | 1/16 | 0 |
| 0 | 1/8  | 1/4 | 1/8  | 0 |
| 0 | 1/16 | 1/8 | 1/16 | 0 |
| 0 | 0    | 0   | 0    | 0 |

Smoothing filter

Fig. 15 (b)

IMAGE FORMING APPARATUS

RELATED APPLICATION

This application is based on application No. Hei10-102578 filed in Japan, the entire content of which is hereby incorporated by reference.

BACKGROUND OF THE INVENTION

1. Field of the Invention

The present invention pertains to an image forming apparatus such as a copying machine or a laser printer, and more particularly to a technology to correct positional discrepancies pertaining to an image.

2. Description of the Related Art

In a color image forming apparatus, the image to be formed is generally broken down into the four colors of cyan (C), magenta (M), yellow (Y) and black (Bk), and after a toner image is formed for each color, these single-color images are transferred onto a recording medium such that each image overlays the preceding images, so as to form a multi-color image. Therefore, if the single-color images are not completely overlaid on top of the previous images, color discrepancies occur, resulting in poor image quality.

In particular, color discrepancies easily occur in a tandem-type image forming apparatus, and the formulation of a method to reduce this problem is a key task. A tandem-type image forming apparatus comprises image forming units that each form single-color images and are sequentially located along a transfer belt. The single-color images are overlaid onto the transfer medium in synchronization with the conveyance of the transfer medium while the image forming time is adjusted for each color.

In a tandem-type image forming apparatus, resist correction has conventionally been performed in order to correct the image forming positions and prevent color discrepancies. In resist correction, a resist mark that has a prescribed configuration is formed on the transfer belt by each image forming unit, and the resist marks are detected by means of an optical sensor to calculate the amounts of discrepancy in the positions of the single-color images.

When detecting the positions of the resist marks in such resist correction, however, in order to prevent color discrepancies and maintain image quality, very precise detection of several $\mu$m to less than 20 $\mu$m is required.

Conventionally, for the detection of the positions of the resist marks, an optical sensor that uses a CCD or a photodiode as the photoreceptor has been used. Available methods to confirm the position of the resist mark include (1) a method that seeks the center of the waveform from the leading and trailing edges of the waveform that is obtained when the line comprising the resist mark passes the sensor (sampling waveform), (2) a method that deems the point at which the maximum value is obtained to be the peak of the waveform, and (3) a method that seeks the centroid of the waveform from the sampling result.

Using these conventional detection methods, the shorter the resist mark sampling intervals are, the more reliably and precisely the resist mark can be detected. In this case, however, since the signals must be switched at high speed, the use of a CPU with high-level processing capabilities is required, which leads to an increase in cost. An additional problem is that the rapid switching of signals causes high-frequency noise, which adversely affects the resist mark detection signals and generates errors.

Where even minor errors occur in the detection signals, it becomes difficult to seek the accurate position of the resist mark and precise resist correction cannot be performed.

SUMMARY OF THE INVENTION

The object of the present invention is to eliminate the problems described above.

Another object of the present invention is to improve the level of precision in resist mark position detection.

The third object of the present invention is to provide an image forming apparatus capable of forming high-quality images by improving the precision level in resist mark position detection without reducing the resist mark sampling intervals.

The fourth object of the present invention is to provide an image forming apparatus capable of forming high-quality images by improving the precision level in resist mark position detection using a simple method.

These and other objects are attained by an image forming apparatus comprising; multiple image forming units, a resist mark forming means that forms resist marks on the transfer belt by means of the multiple image forming units, a sensor that detects the multiple resist marks formed, a mark control means that controls the resist mark forming means so that it will form such resist marks that the waveforms of their detection signals by means of the sensor will comprise peaked waveforms, a detecting means that detects the positions of the peaks detected by the sensor, and an image formation control means that controls the timing at which image formation begins by the multiple image forming units based on the peak positions detected.

The invention itself, together with further objects and attendant advantages, will best be understood by reference to the following detailed description taken in conjunction with the accompanying drawings.

BRIEF DESCRIPTION OF THE DRAWINGS

FIG. 14(*b*) is a drawing showing the configuration of a pattern II for resist correction.

FIGS. 15(*a*) and 15(*b*) are space filters for MTF correction.

In the following description, like parts are designated by like reference numbers throughout the several drawings.

DESCRIPTION OF THE PREFERRED EMBODIMENTS

The embodiments of the present invention are explained below with reference to the drawings.

Embodiment 1

(1) Construction of Copying Machine

Figure 1:
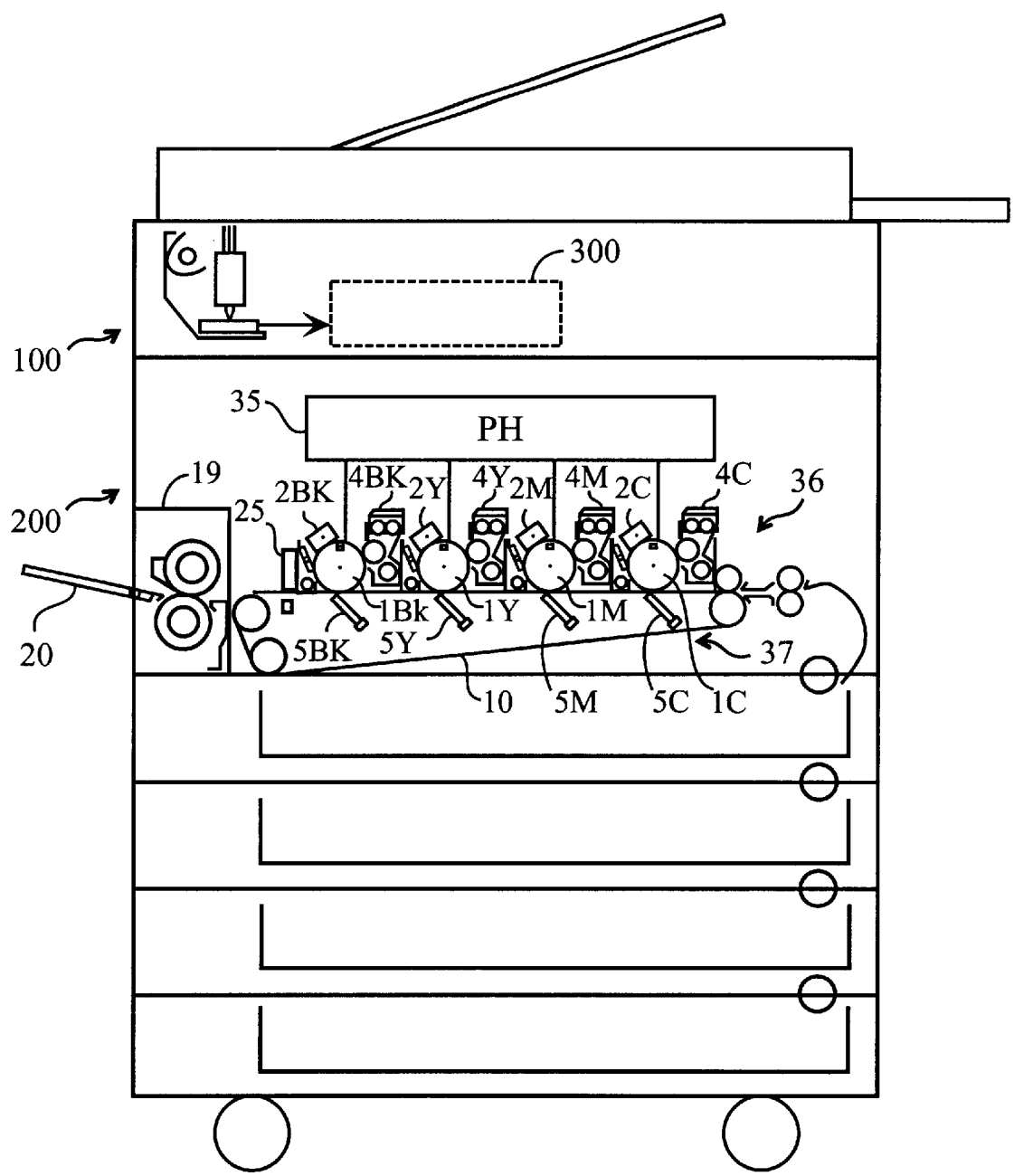
FIG. 1 is a cross-sectional view of a digital color copying machine pertaining to an Embodiment 1.

FIG. 1 shows the cross-sectional view of a digital color copying machine pertaining to this embodiment (hereinafter simply called 'the copying machine'). This copying machine is termed a tandem-type apparatus. It forms color images by transferring images such that they overlay the previous images, by means of multiple image forming units that are aligned along a transfer belt.

As shown in FIG. 1, the copying machine comprises an image reader 100 that reads the image of the original document and a printer 200 that reproduces the image read by the reader 100 onto a transfer medium that is conveyed by means of a transfer belt These members are controlled by a controller 300.

The image reader 100 is a public-domain device that reads the original document on the platen glass by means of a CCD color image sensor and obtains R, G and B electric signals. These electric signals thus obtained are further converted by the controller 300 into eight-bit gradation data in the colors of yellow (Y), magenta (M), cyan (C) and black (Bk), and processing such as chromatic correction is then performed in order to improve image reproducibility.

The printer 200 comprises a printer head unit 35, an image formation system 36, and a conveyance system 37. The laser diodes for each color (not shown in the drawing) inside the printer head unit 35 are driven based on the signals output from the controller 300 such that laser beams are emitted, and the laser beams expose and scan the photoreceptors 1C through 1B*k*, which are rotated in the image formation system 36.

The photoreceptors 1C through 1B*k* are uniformly charged by means of chargers 2C through 2B*k* before they are exposed by the laser beams and electrostatic latent images are formed through the exposure. The electrostatic latent images are developed by developing units 4C through 4B*k* using cyan, magenta, yellow and black toners, respectively. The toner images thus developed are transferred onto the transfer medium conveyed by the transfer belt 10 such that they are overlaid over the previous images based on the transfer electric field applied by the transfer brushes 5C through 5B*k*.

The transfer medium onto which the toner images have been transferred is separated from the transfer belt 10, and the toner images are bonded to the transfer medium by means of a fusing unit 19. The transfer medium is then ejected onto a paper eject tray 20. In this embodiment, the transfer belt 10 is formed of a transparent material such as polyethylene terephthalate.

An optical sensor unit 25 is located at the end of the downstream area in terms of the direction of conveyance by the transfer belt 10. Resist correction is performed using the detection output from this optical sensor unit 25. For the optical sensor unit 25, a transmission-type optical sensor is used. An LED is used for the light emitting member and a photodiode is used for the photoreceptor. Where the transfer belt 10 is non-transparent, a reflection-type optical sensor may be used. The resist correction performed using this type of optical sensor unit 25 is described below.

(2) Construction of Controller 300

The construction of the controller 300 will now be explained based on the block diagram of FIG. 2.

Figure 2:
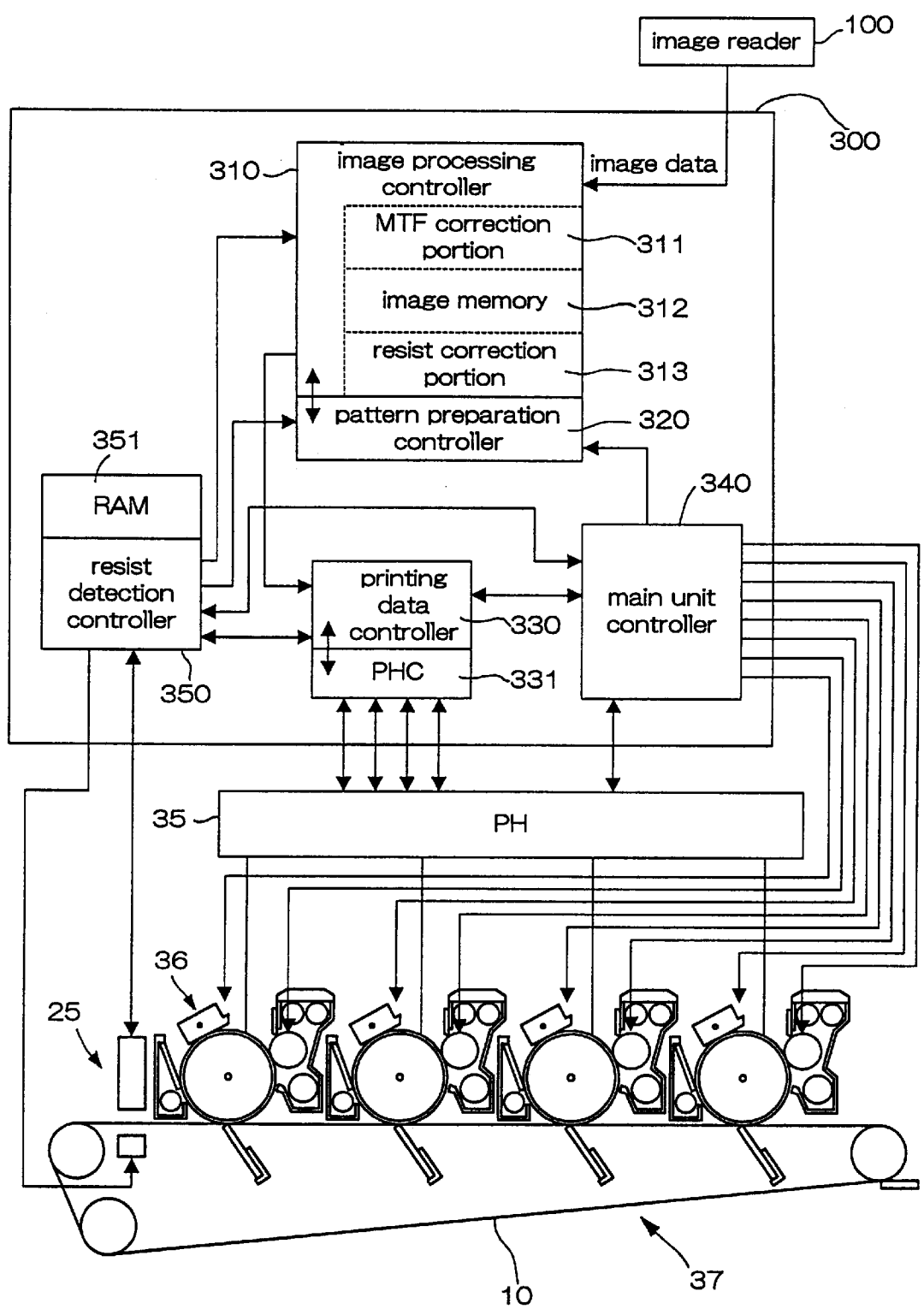
FIG. 2 is a block diagram showing the controller of the digital color copying machine pertaining to the Embodiment 1.

As shown in FIG. 2, the controller 300 comprises an image processing controller 310, a pattern preparation controller 320, a printing data controller 330, a main unit controller 340, and a resist detection controller 350. The controllers 310 through 350 each comprise a CPU and other components, and each is connected to a ROM that stores control programs and various startup data and a RAM that temporarily stores control variables.

The image processing controller 310 includes an MTF correction portion 311, an image memory 312 and a resist correction portion 313.

The R, G and B image data obtained through the reading of the original document by the image reader 100 is input, after A/D conversion and shading correction, to the image processing controller 310 and converted into darkness data for the colors of cyan, magenta, yellow and black, which are the reproduction colors. The darkness data undergoes data processing for image improvement, such as edge enhancement and smoothing, by the MTF correction portion 311, and then is stored in the image memory 312 according to its reproduction color.

The printing data controller 330 drives the printer head unit 35 via the printer head controller (PHC) 331 based on the printing data output from the image processing controller 310, and causes the laser beams to be emitted such that they expose and scan the photoreceptor drums.

On the other hand, the pattern preparation controller 320 generates resist mark printing data during resist correction and sends the data to the printing data controller 330 at prescribed times. The resist marks for each color are then formed on the transfer belt 10 by means of the printing data controller 330 and the printer head controller 331.

The resist detection controller 350 controls the ON/OFF operation of the optical sensor unit 25. It also samples the resist mark detection signals from the optical sensor unit 25 at certain intervals and converts them through A/D conversion. The sampled signals are stored in the RAM 351. The centroid position of the waveform formed by the sampled signals is then sought. The centroid position thus sought is sent to the image processor 310 as resist mark position information.

The resist correction portion 313 of the image processor 310 calculates the relative discrepancies among the resist marks based on the resist mark position information and changes the addresses for the image data for each color stored in the image memory to the extent of said discrepancies. Based on the image data, the addresses for which were changed, a color image without color discrepancies is formed via the printing data controller 330 and the printer head controller 331.

The main unit controller 340 controls the image reader 100, the printer head unit 35 and the conveyance system 37, as well as the printing data controller 330, while adjusting timing to execute a smooth image forming operation.

The specific configuration of the resist marks and the operation to detect the positions of the resist marks will now be explained.

When the main unit controller 340 issues an instruction to perform resist correction, the pattern preparation controller 320 reads the resist mark printing data from its internal ROM and sends it to the printing data controller 330. The printing data controller 330 causes the resist marks for each color to be formed at prescribed times on the transfer belt 10 based on the printing data in cooperation with the printer head controller 331, the printer head unit 35 and the image formation system 36.

Figure 3:
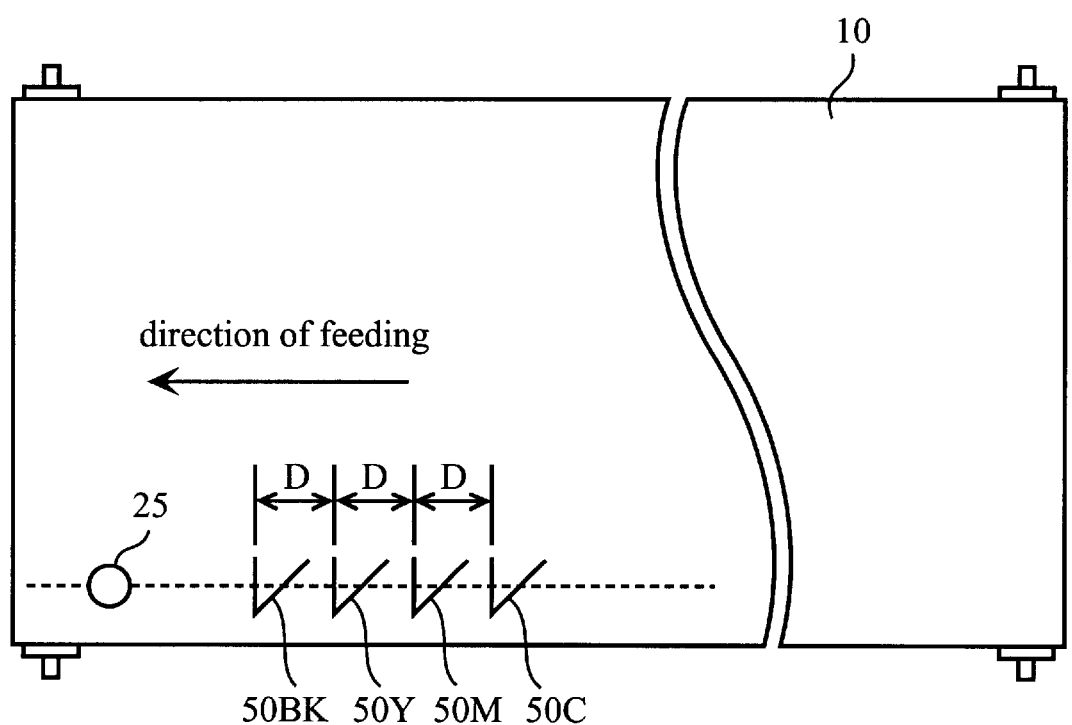
FIG. 3 is a drawing showing one example of resist marks formed on the transfer belt.

FIG. 3 shows one example of the resist marks formed on the transfer belt 10. The resist marks 50B$k$ through 50C each have an identical V shape. Each mark comprises a CD line that is perpendicular to the direction of conveyance and another line that is angled at 45° relative to the CD line. Where the image writing positions on the photoreceptors 1C through 1B$k$ and transfer positions are properly set, i.e., where no color discrepancies occur, these resist marks are formed on the transfer belt 10 such that the center of the pattern matches the detection line of the optical sensor unit 25 (the dotted line in the drawing) in the direction perpendicular to the direction of conveyance (main scanning direction), and the marks are distanced from one another by a distance D in the direction parallel to the direction of conveyance (sub scanning direction). The configuration of the resist marks is not limited to the example shown here. Various other configurations may be used as well.

These resist marks are sequentially detected at prescribed sampling intervals by means of the optical sensor unit 25 as the transfer belt 10 moves. The resist detection controller 350 stores the detected sampling signals in the RAM 351 and seeks the centroid positions of the waveforms formed based on the sampling signals (hereinafter 'the sampling waveforms').

Figure 6:
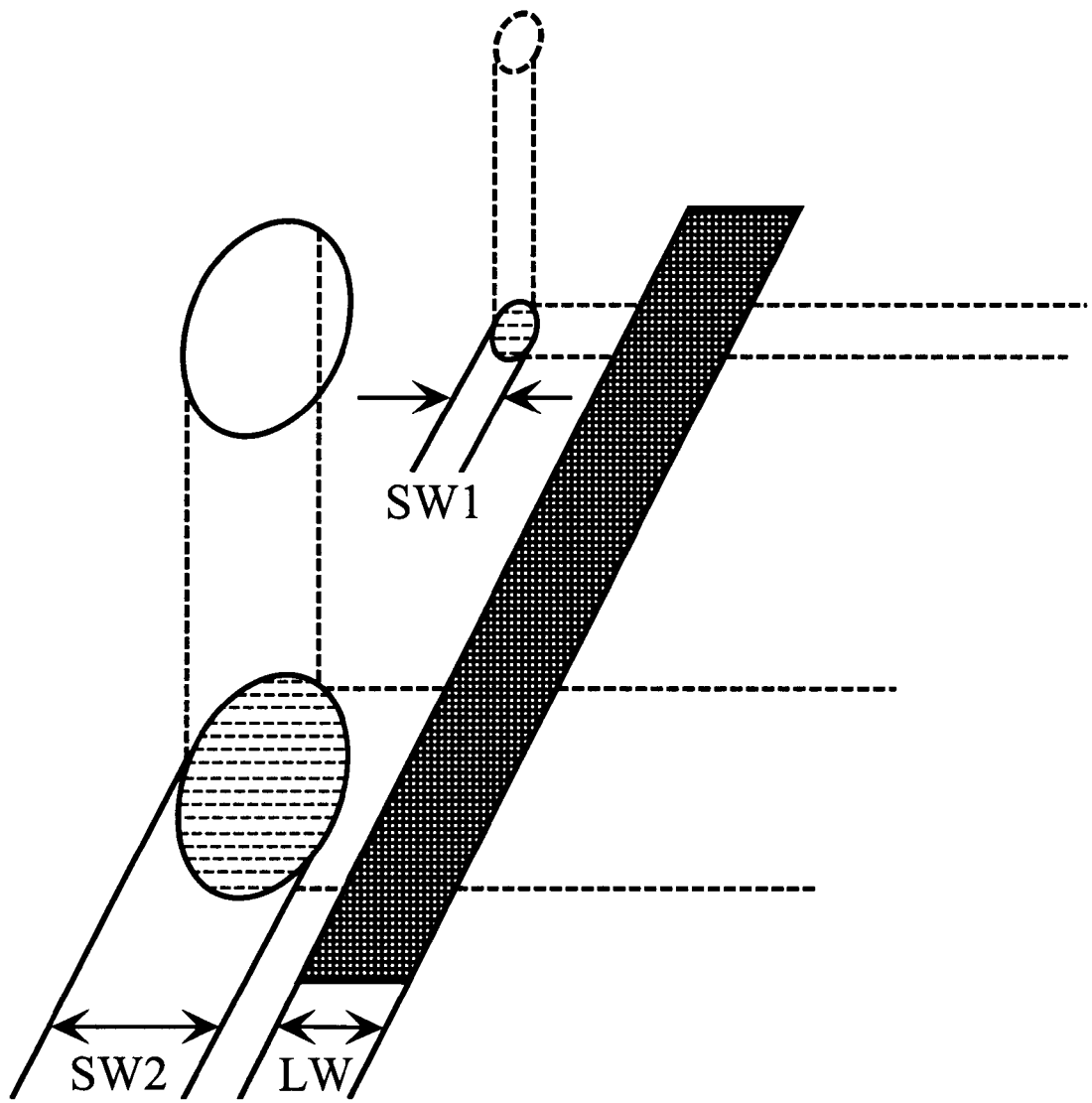
FIG. 6 is a drawing showing the relationship between the photoelectric sensor's detection width and the resist mark line width in the detection direction.

We will now examine the situation in which the sampling waveform is formed so to be essentially trapezoidal, as shown in FIG. 4(*a*). The solid line in FIG. 4(*a*) represents a waveform of the signals that would be obtained if the signals were continuously detected. Points P1 through P8 represent the actual sampling points. Such a waveform having a trapezoidal configuration is obtained when the detection width SW1 in the direction of detection by the optical sensor unit 25 (this detection width becomes identical to the aperture of the photoelectric sensor if the detection light comprises parallel light) is small relative to the resist mark line width LW, as shown in the upper part of the FIG. 6.

In such a case, in order to seek the centroid position of the sampling waveform, the interpolation data between sampling points is regularly sought and integration is sequentially performed from both ends of the sampling waveform. When the areas on both sides of the border become equal, the position of that border is deemed the centroid position. However, in FIG. 4(*a*), the signal output suddenly changes between the sampling points P2 and P3 and between the sampling points P6 and P7, and moreover, the rate of increase varies from one area to another. Therefore, it is difficult as a practical matter to accurately interpolate the data between these points. Such an interpolation would lead to a quite different result from the signal waveform represented by the solid line. Consequently, the centroid position of the waveform sought would differ from the actual centroid position, making it impossible to obtain the accurate centroid position.

Moreover, the points on the entire waveform that will be sampled vary depending on the time at which the area on which the resist mark is formed enters the detection range of the optical sensor unit 25. Therefore, the centroid positions regarding each resist mark calculated would be different from each other. It is not possible to accurately obtain the relative positional discrepancies among the four colors based on these erroneous centroid positions.

This issue should be resolved by reducing the sampling intervals so that the sampling waveform will come closest as possible to the real waveform shown by the solid line. However, this method is problematic due to the detection errors that would occur as a result of the high-frequency noise that would take place as the sampling was performed at a high speed, and due to the increased costs that would be entailed by the adoption of an expensive CPU, as described above.

Therefore, in this embodiment, the resist mark line width and the detection width of the optical sensor unit 25 (sensor aperture width) in the direction of detection by the optical sensor unit 25 (i.e., the direction of feeding by the transfer belt 10) are set so that they will have a prescribed relationship. By doing so, a detected waveform that allows easy interpolation between sampling points may be obtained.

FIG. 4(*b*) shows one example of such a detected waveform. The waveform shown in FIG. 4(*b*) comprises a waveform that is symmetrical as to a vertical center line and the slope gently rises from the lowest point to the peak (hereinafter, such a waveform configuration will be termed 'a peaked waveform').

Points Q1 through Q10 represent examples of sampling points. Sampling is performed using the same sampling intervals as those used for FIG. 4(*a*).

If the waveform comprises a peaked waveform having gentle rising and falling slopes, there are no areas between sampling points exhibiting an abrupt change. This allows the slope between sampling points to be easily inferred and thus accurately interpolated. Such a detected waveform may be obtained by making the detection width SW2 of the optical sensor unit 25 large relative to the resist mark line width LW, as shown in the lower part of FIG. 6.

In particular, where the sampling waveform resembles a known curve, inference for interpolation data is even easier. The peaked waveform shown in FIG. 4(*b*) resembles the public-domain Gaussian waveform. Such a Gaussian waveform is characterized in that the waveform width w1 at level V1, which is half the level of the peak Vp, is approximately 0.6 of the waveform width w2 at level V2, which is $1/e^2$ times that of the peak Vp.

Therefore, the detection width SW2 and the resist mark line width LW should be set relative to each other so that the ratio w1/w2 will be approximately 0.6. This adjustment can be easily achieved by changing the detection width of the optical sensor unit 25 and/or the resist mark line width.

Further, the detected waveform resembles a sine wave when w1/w2 is approximately 0.7. Our experiment made it clear that such a waveform could be obtained when the ratio of the resist mark line width LW to the detection width SW2 was approximately 1:2.

Where the detected waveform resembles the public-domain Gaussian waveform or a sine wave, inference of the interpolation data between the sampling points is very easy.

In other words, accurate interpolation data may be obtained by storing the data on the rate of change of the known curve or the relational expression of the curve itself in the data ROM in the resist detection controller 350 and by calculating the interpolation data from the data for the adjacent two sampling points and the rate of change or the relational expression. This makes it possible to accurately seek the centroid position of the sampling waveform without shortening the sampling intervals.

Figure 4A:
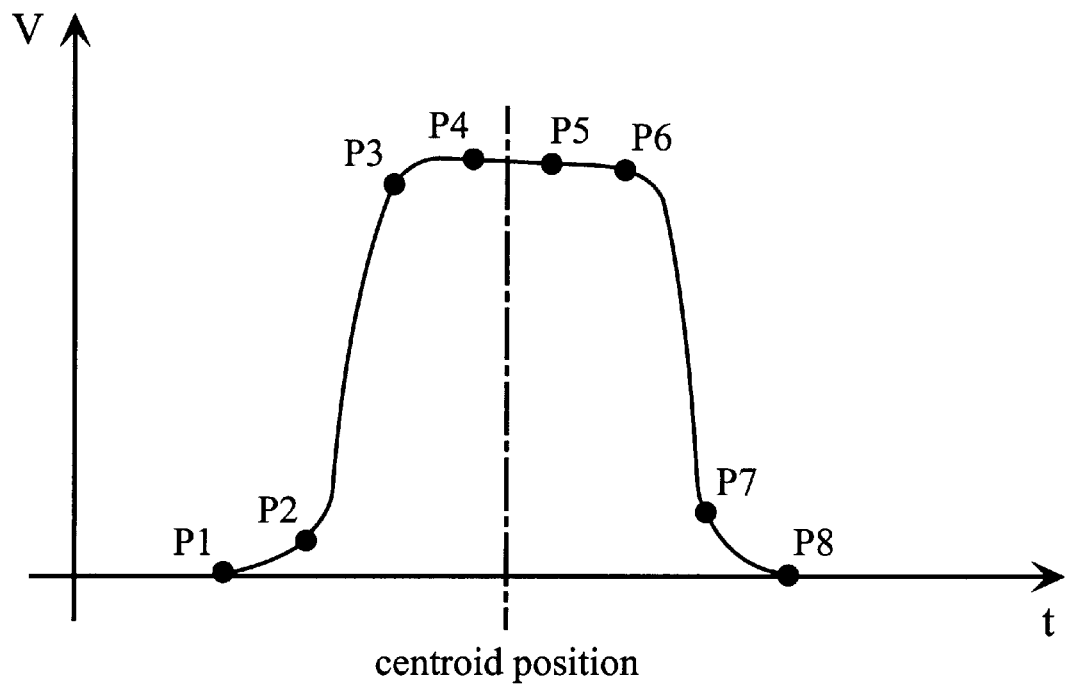
FIGS. 4(a) and 4(b) are graphs each showing a resist mark sampling waveform.
Figure 5:
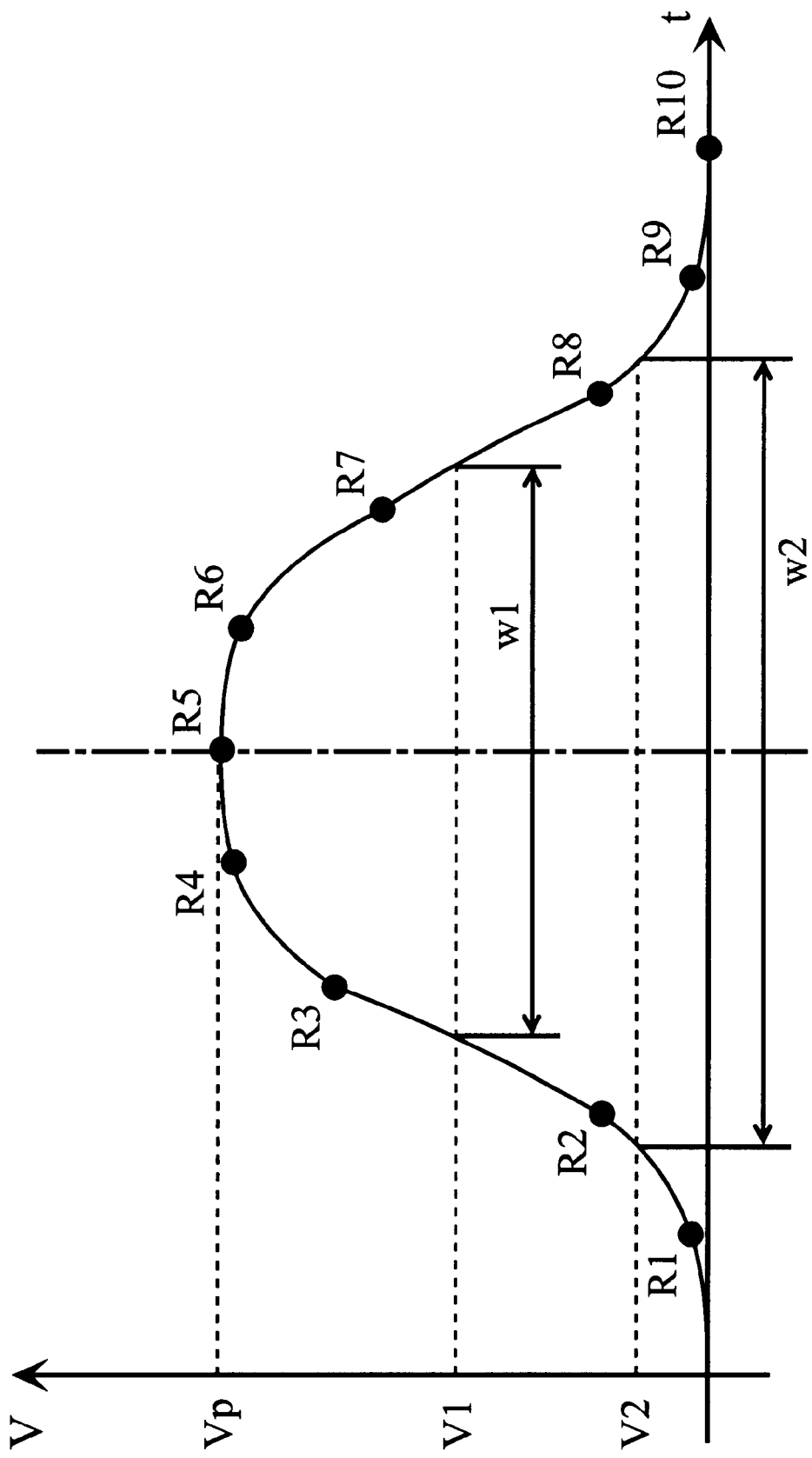
FIG. 5 is a graph showing another example of a resist mark sampling waveform.

If the detection width is gradually reduced, the waveform comes increasingly closer to the waveform shown in FIG. 4(a). However, it was experimentally determined that where a CPU generally used in a copying machine (approximately 10 MHz) was used, the maximum tolerable error in the detection of the centroid position was reached when the w1/w2 ratio of the sampling waveform became approximately 0.8, as shown in FIG. 5. This waveform was obtained when the ratio of the resist mark line width to the optical sensor unit 25 detection width in the direction of detection was approximately 3:1.

During this experiment, the conveyance speed of the transfer belt 10 (system speed) was 150 mm/sec, the line width was 2 mm and the sampling interval was 0.4 msec.

The resist detection controller 350 sends the data regarding the centroid positions of the CD line and the angled line of each resist mark sought in this manner to the resist correction portion 313.

(3) Resist correction

The control for the resist correction in the copying machine having the construction described above will now be explained.

Figure 7:
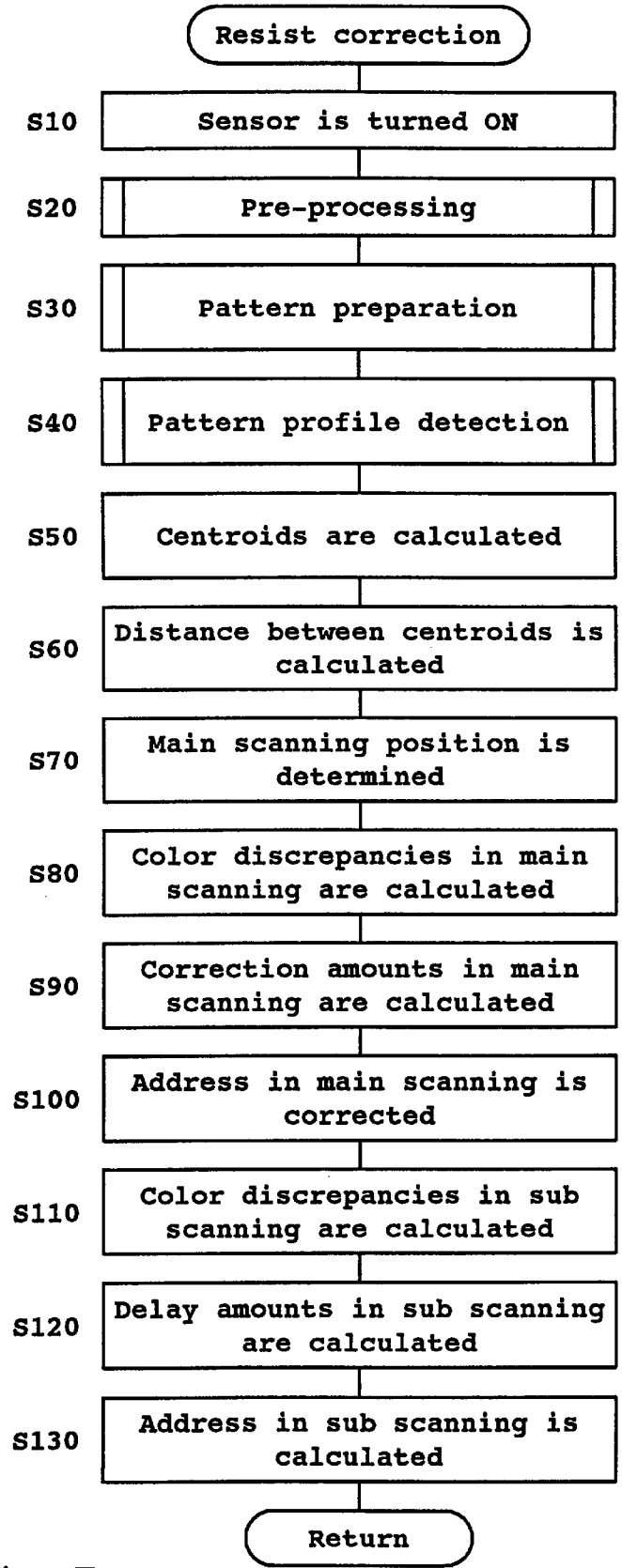
FIG. 7 is a flow chart showing the control regarding resist correction in the Embodiment 1.

FIG. 7 is a flow chart showing the resist correction. This resist correction is programmed such that it is executed where necessary. In particular, it is executed when the power to the copying machine is turned ON as well as after a prescribed number of copies are made.

Figure 8:
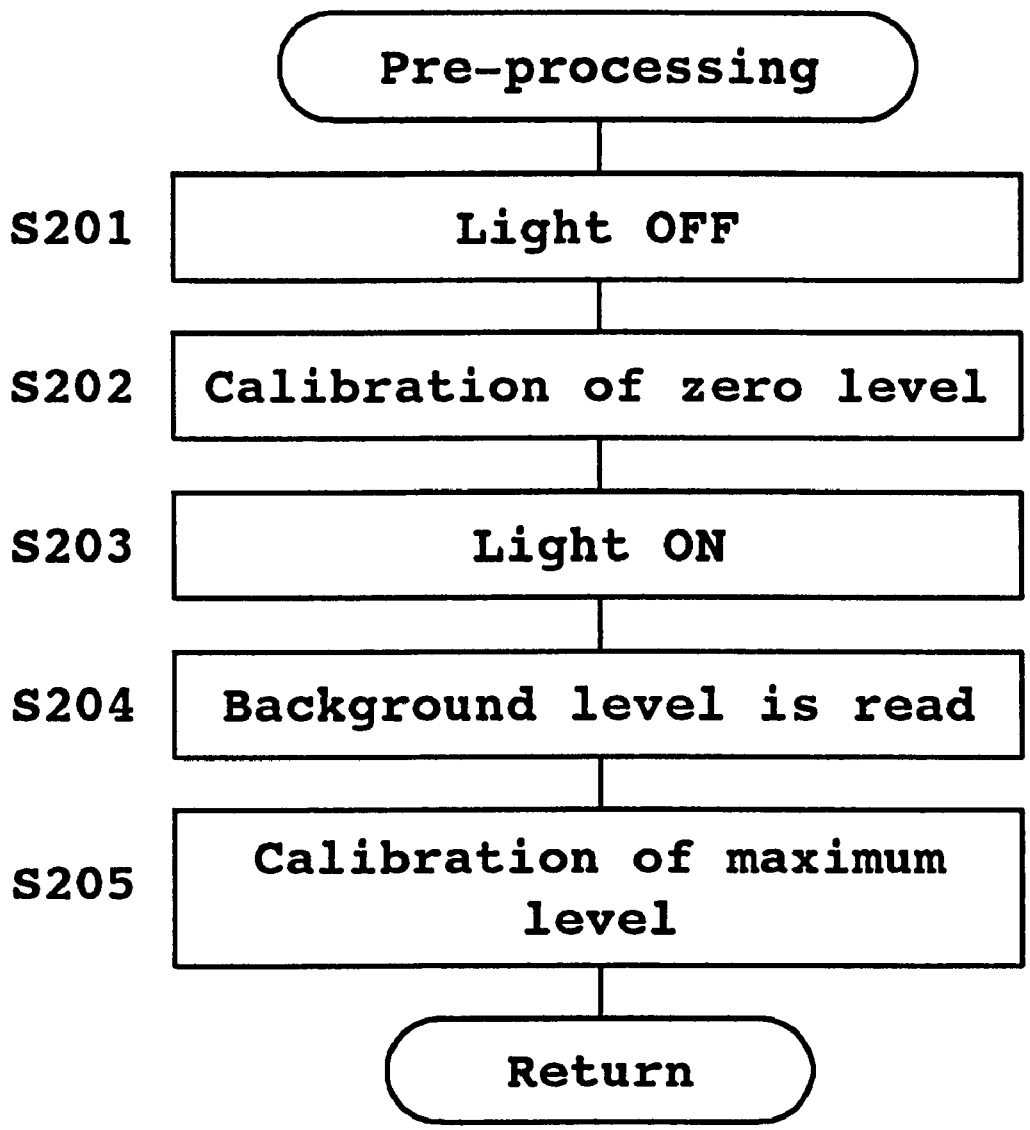
FIG. 8 is a flow chart showing the control regarding pre-processing.

First, the switch of the optical sensor unit 25 is turned ON by the resist detection controller 350 (S10). Pre-processing to calibrate the sensor output is then performed (S20). FIG. 8 is a flow chart showing this pre-processing. The light source of the optical sensor unit 25 (LED) is first turned OFF (S201), and calibration using the output at this time as zero level output takes place (S202). The light source is then caused to emit a prescribed amount of light (S203), and the output that is obtained by irradiating the photoreceptor of the optical sensor unit 25 via the transparent transfer belt 10 with this emission is read as the background output (S204). Calibration is then performed such that this background level is deemed the maximum level of detection (S205), and the calibrated values for the zero level and the maximum level are stored in the RAM 351. The subsequent detection output from the optical sensor unit 25 is calibrated using these values.

When the pre-processing described above is finished, the pattern preparation process in which the resist marks for each color (these resist marks are hereinafter collectively termed 'the patterns') are formed on the transfer belt 10 (S30).

Figure 9:
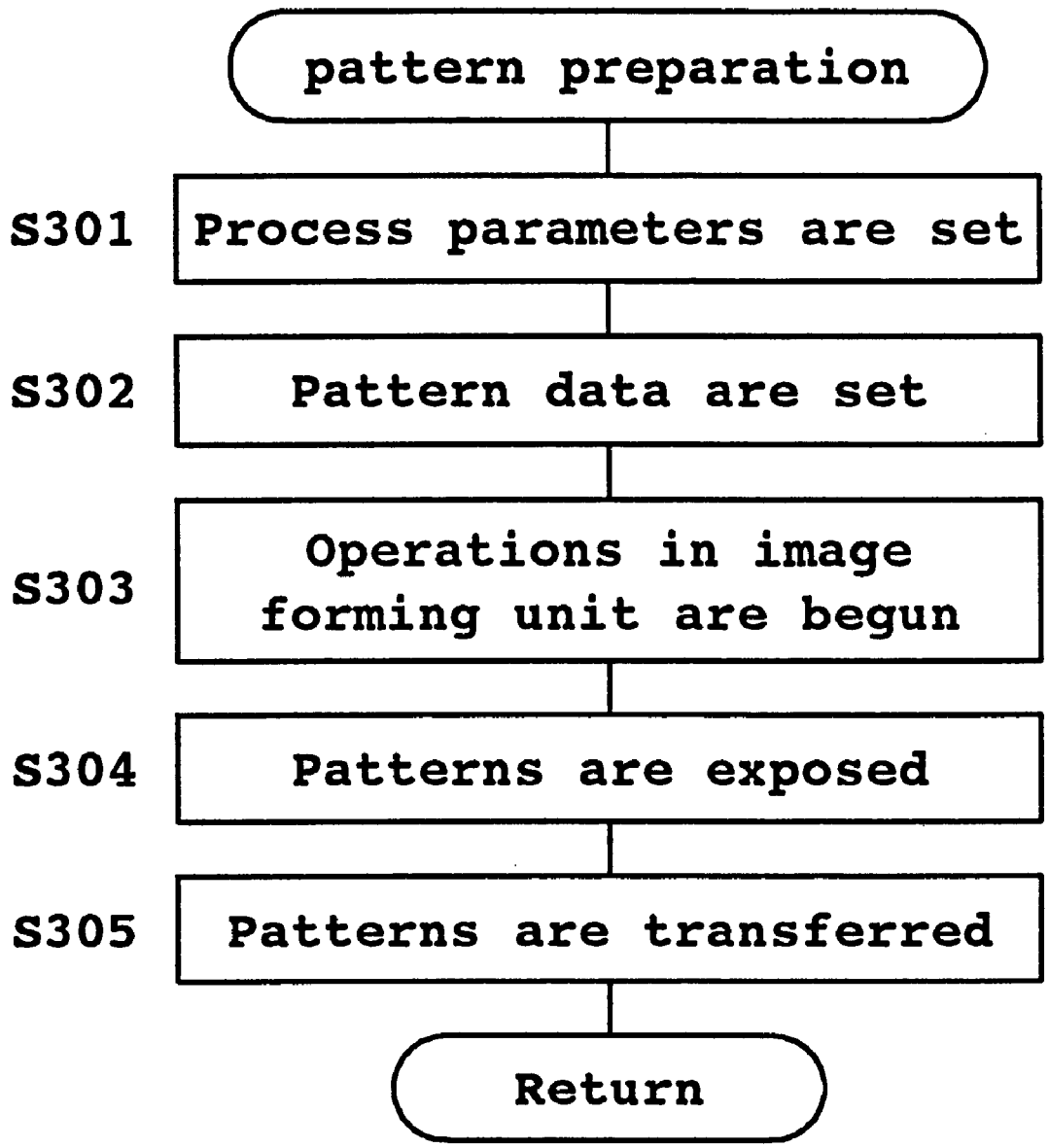
FIG. 9 is a flow chart showing the control regarding pattern formation.

FIG. 9 is a flow chart showing the pattern preparation process. In the pattern preparation process, the process parameters, i.e., the grid voltage levels and the bias voltage levels, are set in the main unit controller 340 (S301). These process parameters are sought in advance for each color so that the image darkness will be appropriate, and are stored in the internal ROM.

The resist mark printing data for each color is then read from the ROM inside the printing data controller 330 and is set in the internal line memory as image data to write (S302), whereupon the operations of various members of the image forming units are begun (S303). In other words, the operations of the image formation system 36 and the conveyance system 37 are begun, including (i) the rotation of the photoreceptors 1C through 1B$k$ and the transfer belt 10 via the control by the main unit controller 340, and (ii) the operations of the developing units 4C through 4B$k$.

The photoreceptor drums 1C through 1B$k$ are then exposed at prescribed times, by means of the printer head unit 35 based on the data regarding the pattern set in S302, to write electrostatic latent images of the resist marks on the photoreceptor drums. After these electrostatic latent images are developed by means of the developing units 4C through 4B$k$, they are transferred onto the transfer belt 10 (S305).

Figure 10:
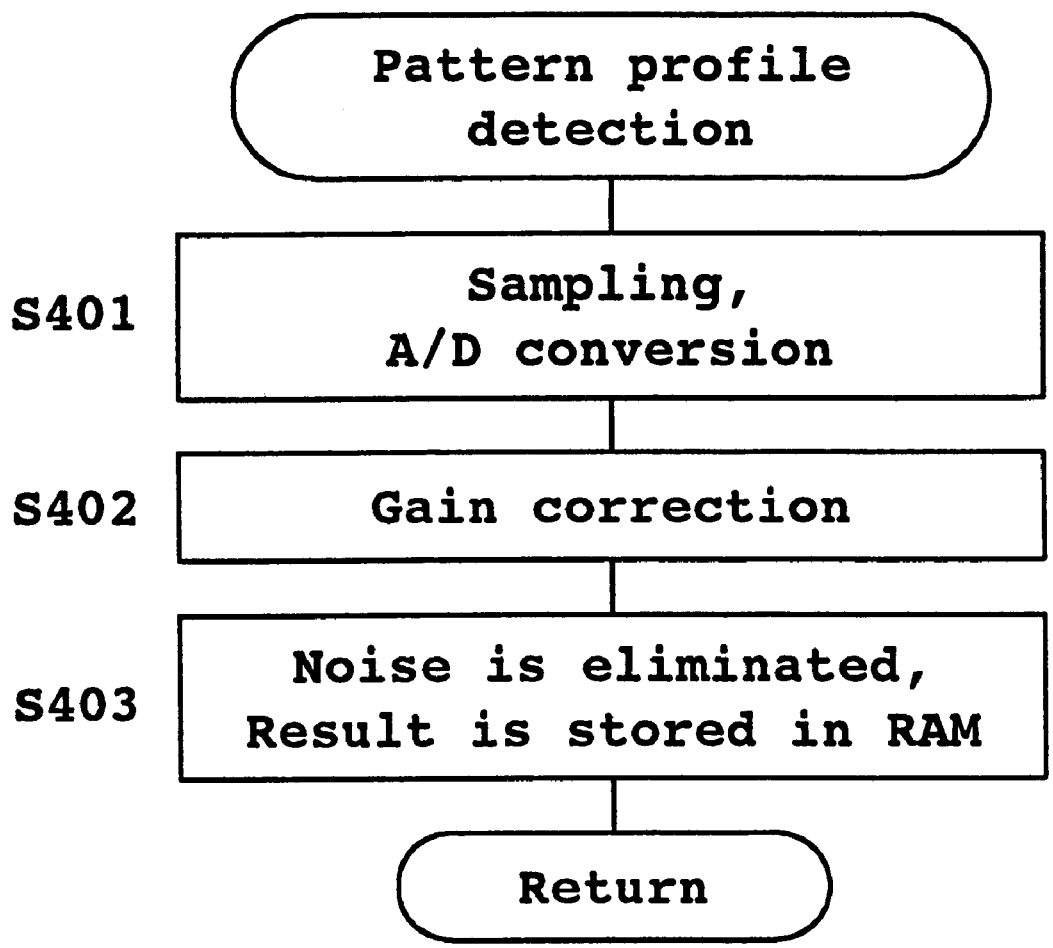
FIG. 10 is a flow chart showing the control regarding pattern profile detection.

When the pattern preparation process described above is completed, the pattern profile detection process begins (S40). In this step, correction is made to the detected signals from the optical sensor unit 25, and the process to detect the sampling waveform regarding each resist mark (pattern profile) is executed. FIG. 10 shows the flow chart indicating the pattern profile detection process. In this process, the darkness on the surface of the transfer belt 10 is detected by means of the optical sensor unit 25 at certain sampling intervals. The darkness level detected is then converted into a digital value (S401).

As shown in FIG. 3, the resist marks 50C through 50B$k$ are formed such that they overlap the detection line of the optical sensor unit 25 in the main scanning direction. Therefore, the detected darkness changes every time the CD lines and the angled lines of the resist marks 50C through 50B$k$ pass under the optical sensor unit 25, whereby the positions of the CD lines and the angled lines are detected.

During this detection, the resist detection controller 350 changes the amperage to the LED, which comprises the light emitting member of the optical sensor, to the predetermined level in response to the resist marks for each color (light amount correction). The time at which the amperage is changed is calculated in accordance with the time at which the resist marks are transferred and the speed of the transfer belt 10. In other words, the amperage is changed based on the time that elapses before each resist mark reaches the detection position of the optical sensor unit 25. It is also acceptable if the light emission amount from the LED is changed assuming that the color changes each time the detected level exceeds the prescribed level twice in consideration of the change in the output that occurs when the CD line and the angled line are detected.

The detection output regarding each resist mark is amplified using a prescribed output amplification rate, and the detection output is further corrected (amplification rate correction, S402).

The light amount and the amplification rate vary from one color to another in order to make the output of the optical sensor unit 25 for each resist mark approximately uniform. In other words, even if the toner concentration is constant for cyan, magenta, yellow and black, the transmission rate varies from one color to another. Therefore, the amperage to the LED and the output amplification rate are sought in advance for each color so that the detection output by means of the optical sensor unit 25 regarding the resist marks will be the same, and the pre-determined values are stored in the ROM inside the resist detection controller 350 in the form of a table.

In other words, by making the output of the detection signals for the resist marks uniform, the detected waveforms can be made into the identical ideal forms. Therefore, interpolation between sampling points can be carried out using a common interpolation coefficient or function for all the colors, such that the centroid positions may be calculated accurately and rapidly.

Finally, the high-frequency noise is eliminated from the detection output using a low-pass filter. The result is then recorded in the RAM 351 and data comprising a sampling waveform as shown in FIG. 4(*b*) (pattern profile) is generated.

When the sampling regarding the darkness on the transfer belt is finished via the operation described above, the centroid position of the sampling waveform is sought as positional information regarding the CD line and the angled line of each resist mark (S50) from the result of the sampling.

As described above, the centroid position is sought in the following way. Data for interpolation points between sampling points above a certain level is calculated and integration is performed as to the areas surrounded by the waveform that is obtained by connecting the sampling points and the interpolation points, from both ends of the waveform. The position at which a line drawn upward perpendicularly to the X axis forms two equal areas underneath the waveform is deemed the centroid position. As described with regard to the step 20, the waveform obtained from the output of the optical sensor unit 25 is of an appropriate form for each color, and moreover, the detection width of the optical sensor unit 25 and the line width of the resist mark are set so that an ideal peaked waveform as shown in FIG. 4(*b*) will be obtained, a sampling waveform appropriate to seek the centroid position is obtained for each color and the centroid position may be accurately sought.

When the detection points (centroid positions) on the CD line and the angled line of each resist mark are determined, the distance between the detection point on the CD line and the detection point on the angled line of each resist mark, as well as the distance between the detection points on the CD lines of two adjacent resist marks, are calculated by multiplying the interval between the detection of the CD line and the detection of the angled line and the interval between the detection of one CD line and the detection of its adjacent CD line, respectively, by the conveyance speed of the transfer belt 10 (S60).

The main scanning direction detection points of the black resist mark 50B*k* are then confirmed as the main scanning positions (S70). Specifically, the distance between the CD line and the angled line of the resist mark 50B*k* is determined as the main scanning direction standard.

Figure 11:
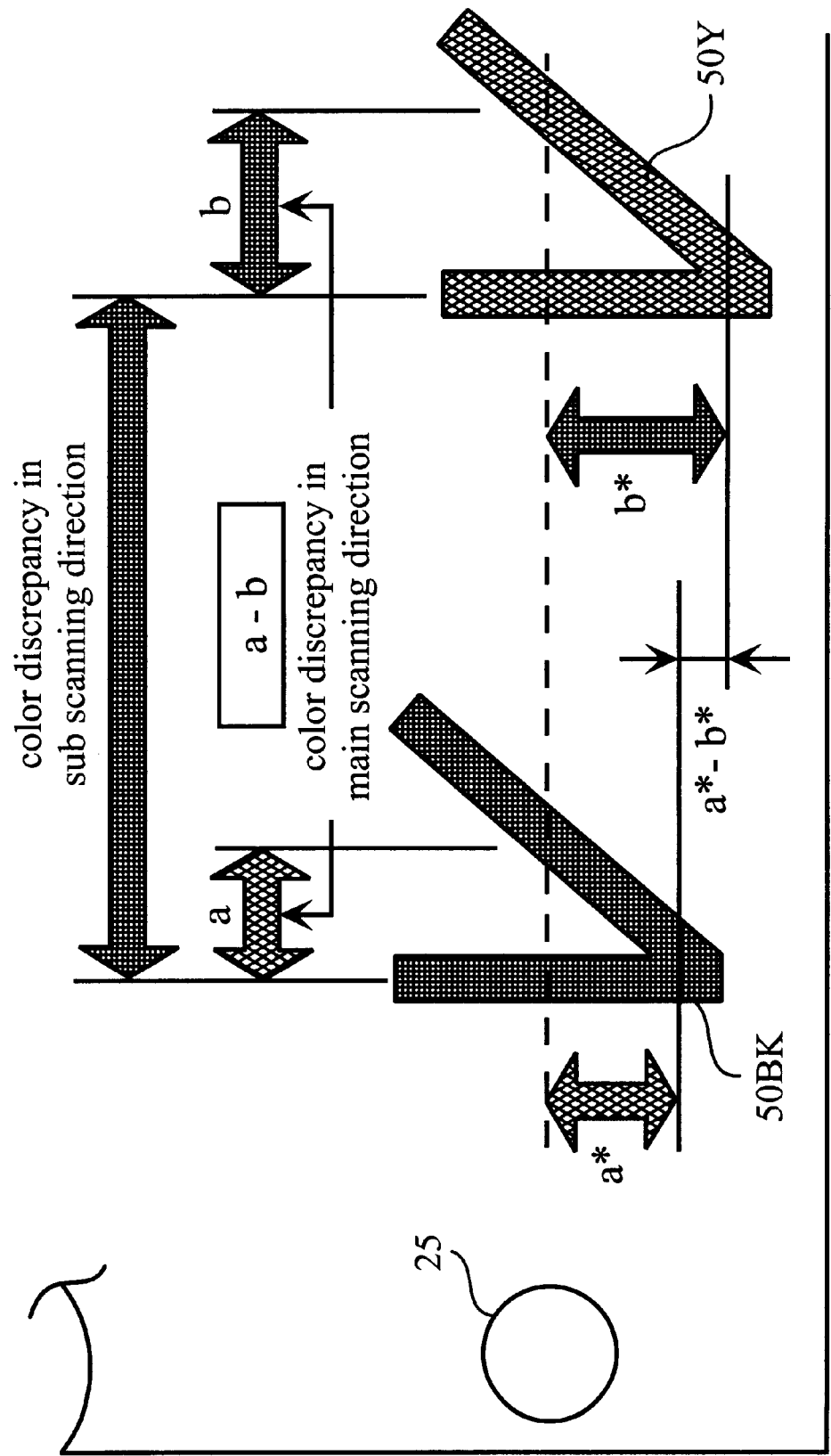
FIG. 11 is a drawing to explain the calculation of positional discrepancies in the main and sub scanning directions.

This will be explained in detail with reference to FIG. 11. FIG. 11 is an enlargement of the areas bearing the resist marks 50B*k* and 50Y actually formed on the transfer belt 10. In this drawing, the relative discrepancy in the main scanning direction between the resist marks 50B*k* and 50Y is expressed as the difference (a*−b*), a* being the distance from the detection point on the CD line of the resist mark 50B*k* to the crossing point of the CD line and the angled line of the same, and b* being the distance from the detection point on the CD line of the resist mark 50Y to the crossing point of the CD line and the angled line of the same, using the optical sensor unit 25's detection line (dotted line in the drawing) as a reference. On the other hand, because the angled line is angled at 45° relative to the CD line, a* and b* are equal to the distance (a) and the distance (b), which are the detection line distances between the CD line and the angled line of the resist marks 50B*k* and 50Y, respectively, and the discrepancy in the main scanning direction between the resist marks 50B*k* and 50Y, i.e., (a*−b*), is equal to (a)−(b). In other words, the relative positional discrepancy in the main scanning direction between resist marks is expressed by the difference in the distance between the CD line and the angled line. Therefore, the relative discrepancies (color discrepancies) in the main scanning direction regarding other colors may be calculated using the distance between the CD line and the angled line of the resist mark 50B*k*.

The color discrepancies in the main scanning direction are then calculated (S80). The positional discrepancies of the resist marks 50C, 50M and 50Y relative to the resist mark 50B*k*, the three colors other than black, may be obtained from the difference between the distance from the CD line to the angled line of each resist mark and the distance from the CD line to the angled line of the resist mark 50B*k*, as explained above.

When the discrepancies in the main scanning direction regarding the resist marks 50C, 50M and 50Y relative to the resist mark 50B*k* are calculated, these discrepancies are converted into main scanning direction image memory address amounts. The address amounts are then deemed the main scanning direction correction amounts (S90). By moving the addresses in the image memory by the address discrepancy amounts, the main scanning direction image formation positions are corrected (S100).

The sub scanning direction correction for the image formation positions then takes place. In the sub scanning direction correction as well, the color discrepancies in the sub scanning direction are first calculated (S110). The resist marks 50C through 50B*k* should be formed at prescribed intervals D as described above. However, where there are discrepancies in the sub scanning direction, the distance between two adjacent resist marks is not necessarily D. In other words, the distance differs from the distance D by as much as the discrepancy. Therefore, the difference between the distance D and the distance between the CD lines of two adjacent resist marks is calculated as the sub scanning direction discrepancy.

The calculated sub scanning direction discrepancies are converted into sub scanning direction image memory address amounts. The address amounts are then deemed the sub scanning direction delay amounts (S120). By moving the addresses in the image memory by the address discrepancy amounts in the sub scanning direction, the sub scanning direction image formation positions are corrected (S130). This completes the resist correction, and the main routine (not shown in the drawing) of the operation of the copying machine is returned to.

As described above, in this embodiment, the resist mark line width and the detection width of the optical sensor unit 25 in the direction of the detection line are set such that the centroid positions may be easily obtained from the sampling waveforms for the lines comprising each resist mark. Therefore, interpolation data may be easily calculated without increasing the frequency of sampling and using a high-capacity CPU. As a result, accurate centroid positions can be calculated. In addition, since the sampling waveforms for each resist mark have approximately the same peak value, interpolation can be performed for all the colors using a common correction coefficient or curve, making the calculation process easier.

Embodiment 2

Figure 4B:
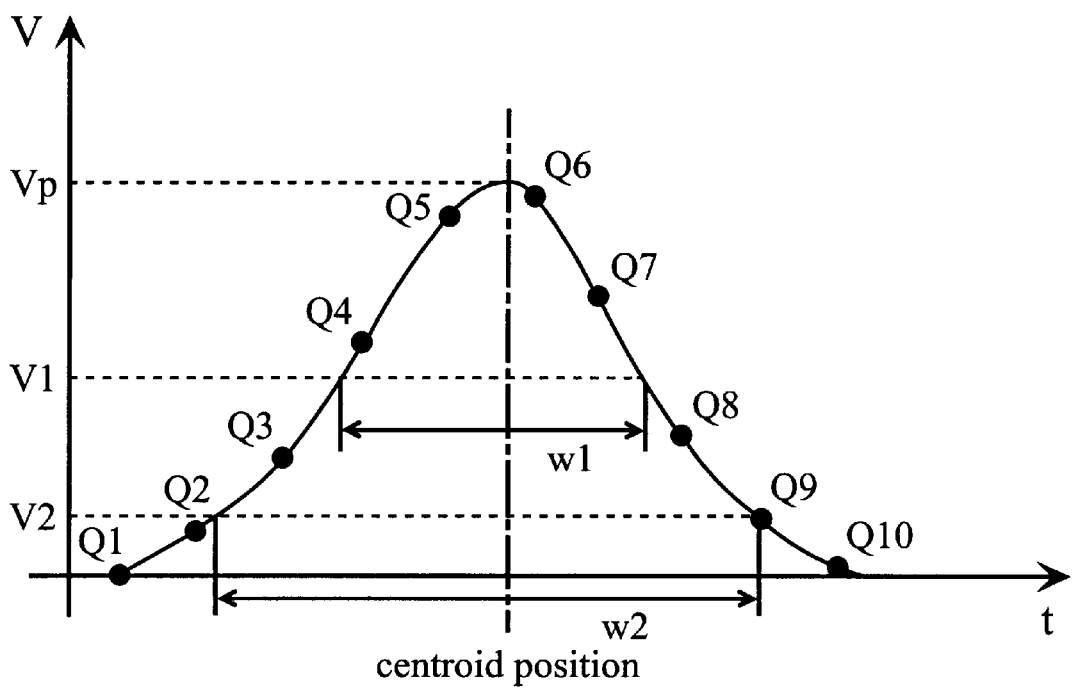

As described above, in the Embodiment 1, the relationship between the resist mark line width and the aperture diameter of the optical sensor in the direction of the detection line was adjusted in order to obtain peaked waveforms, such as the one shown in FIG. 4(b), in which the centroid position may be easily obtained. In the Embodiment 2, in addition to or in place of said adjustment, the darkness of the edges of the resist marks is adjusted.

Figure 12A:
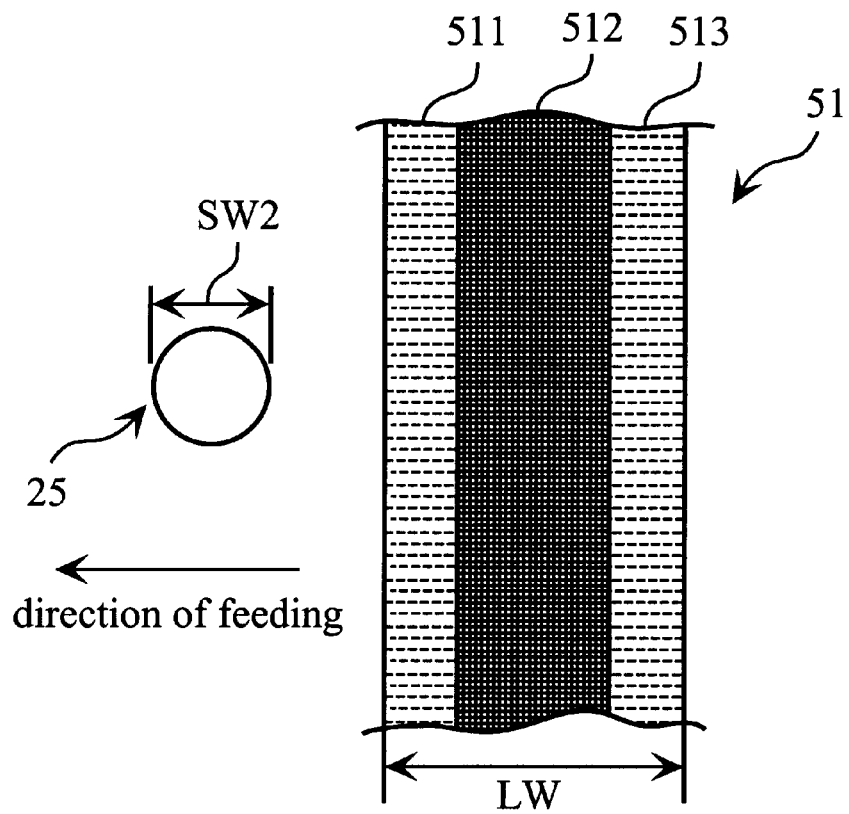
FIG. 12(a) is a drawing showing the configuration of a resist mark in an Embodiment 2.
Figure 12B:
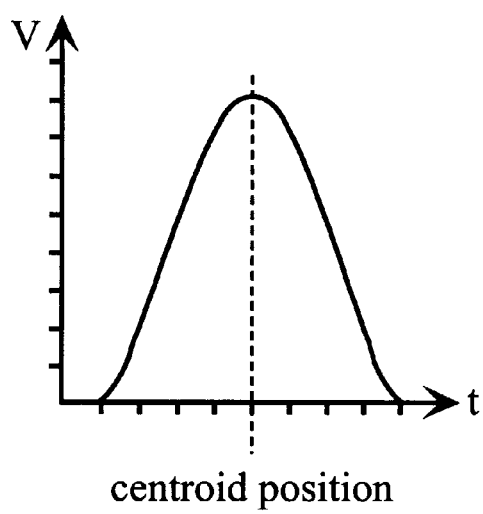
FIG. 12(b) is a graph showing the resist mark detection signal waveform in the Embodiment 2.

FIG. 12(a) shows a part of the CD line 51 of a resist mark in the Embodiment 2. As shown in FIG. 12(a), the CD line 51 is formed such that the edges 511 and 513 are less dark than the center area 512. When the CD line 51 is continuously detected by means of the optical sensor unit 25, the detection waveform shown in FIG. 12(b) is obtained.

The width of the edges 511 and 513 relative to the overall line width LW and their darkness relative to the center area 512 are set in accordance with the sampling waveform sought to be obtained. In addition, if the darkness in the direction of detection changes in a continuous fashion or in multiple gradations, instead of in two gradations between the edges 511 and 513 and the center area 512, the detection signal waveform can further approach the ideal Gaussian waveform or sine wave. This can allow for more reliable detection of the centroid position. If an ideal waveform is obtained in this way, the number of sampling points may be further reduced, and therefore a more inexpensive CPU may be employed.

In addition, because the edges are low in darkness, a further benefit is obtained that the toner does not splash as much when these areas are transferred, resulting in good sampling data. In other words, because the resist marks have conventionally been formed as solid marks, the toner in the edges could splash out in the directions along the line width during transfer and be transferred onto the transfer medium, so that the optical sensor unit 25 might detect the splashed toner as part of the resist mark by mistake. Consequently, it is possible that during the calculation of the centroid position, integration may be performed based on erroneous sampling output and an inaccurate centroid position may be calculated. However, such a problem may be avoided using the Embodiment 2.

Printing data for resist marks having different darkness levels in the direction of the line width, as described above, is sought in advance and stored in the ROM inside the pattern preparation controller 320. This printing data is read during resist correction and resist marks are formed based on the data.

However, even if the printing data is set so that the ideal edge configuration (edges having a different darkness level) will be obtained, the processing conditions become unstable due to the impact of changes in the ambient environment, particularly the humidity. As a result, resist marks having the identical edge configuration may not be formed. In order to avoid this problem, in the Embodiment 2, necessary MTF correction is performed regarding the resist mark printing data such that ideal detection waveforms will be obtained.

Figure 13:
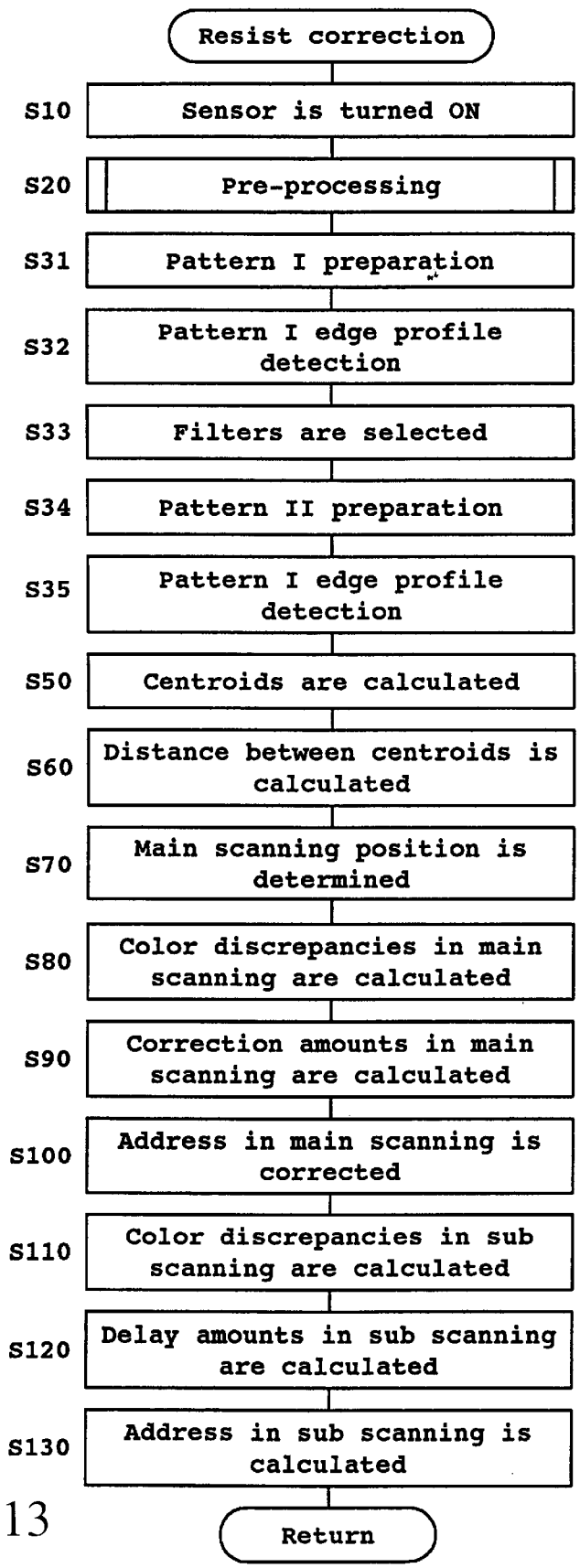
FIG. 13 is a flow chart showing the control regarding the resist correction operation in the Embodiment 2.

FIG. 13 is a flow chart showing the resist correction control in the Embodiment 2. In this flow chart, the steps having the same numbers as the steps in FIG. 7 (S10, S20 and S50 through S130) represent the same processes as in FIG. 7. Therefore, they will not be explained in detail.

First, the switch for the optical sensor unit 25 is turned ON, and pre-processing for the calibration of the sensor is performed (S10, S20). Data for a pattern I to determine the MTF correction parameter values is then prepared and the pattern I is formed on the transfer belt 10 based on this data (S31).

Figure 14:
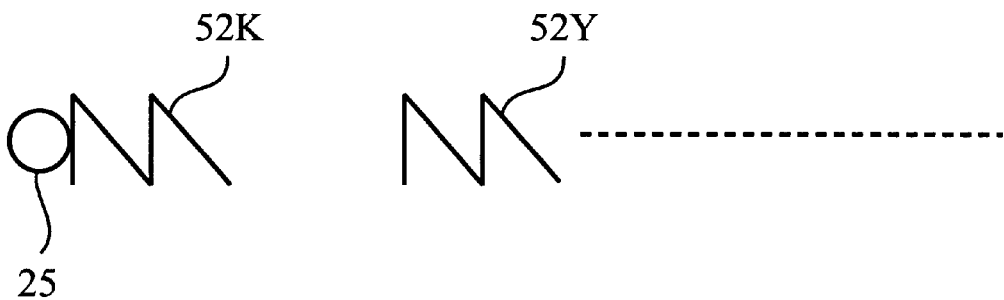
FIG. 14(*a*) is a drawing showing the configuration of a pattern I to obtain an MTF correction coefficient.
Figure 14:

This process is essentially the same as the pattern preparation process shown in FIG. 9, except that data that corresponds to the pattern I (resist marks 52Bk, 52Y . . . as shown in FIG. 14(a) is set as the pattern data.

The profile of this pattern I is then detected using the same method as the one shown in FIG. 10, and stored in the RAM 351 (S32).

The profile is analyzed and space filters that will convert the detection waveforms into the desired peaked waveforms are selected (S33).

Specifically, the following profile analysis method may be used. Detection data values that would be obtained if the printing data set to form an ideal profile was exactly reproduced on the transfer belt are sought through a simulation or experiment in advance. These reference data values and the darkness level obtained through the actual sampling are compared for each sampling point, and a space filter that will reduce the difference is selected.

Other possible methods include (1) a method that calculates the slope between two adjacent sampling points and determines whether the slope for each area is within a pre-determined range, (2) a method that seeks the provisional peak from the detected sampling points and seeks the waveform width w1 at the halfway level of the provisional peak and the waveform width w2 at $1/e^2$ of the provisional peak to determine whether or not the ratio of w1:w2 (w1/w2) is within the desired range, and (3) a method that seeks the difference in the output for each sampling point from a model waveform (a sine wave, for example) to make an evaluation based on the difference.

Using the analysis methods (1) through (3) described above, even where the resist mark printing data is for solid marks, analysis is possible and appropriate MTF correction parameter values may be sought.

Space filters that may be needed based on the analysis results are stored in the ROM inside the pattern preparation controller 320 in the form of tables. For example, where the sampling output for the edges is detected to be smaller than the darkness of the printing data, a Laplacian filter to emphasize the edges, as shown in FIG. 15(a), is selected to correct the edges. Conversely, where the sampling output for the edges is detected to be larger than the darkness of the printing data, a smoothing filter as shown in FIG. 15(b) is selected.

The pattern preparation controller 320 then reads the pattern II printing data from its internal ROM and performs MTF correction of the printing data corresponding to the edges, using the selected space filter. Based on the corrected printing data, a pattern II (resist marks 53Bk, 53Y . . . ) as shown in FIG. 14(b) is formed on the transfer belt 10 (S34) and its profile is detected by means of the optical sensor unit 25 (S35).

The changes in darkness in the direction of the line width regarding the printing data for each pattern II resist mark is pre-set to be the same as the changes in darkness regarding the pattern I. By performing MTF correction of this printing data using the space filter selected based on the pattern I profile detection, an ideal sampling waveform may be obtained.

Steps S50 through S130 are carried out based on the pattern II profile, and the amounts of positional discrepancy in the main scanning direction and sub scanning direction are sought for each resist mark. The image data writing positions in terms of the image memory 312 are then changed, whereupon the resist correction comes to an end. The main routine not shown in the drawings is then returned to.

Figure 16:
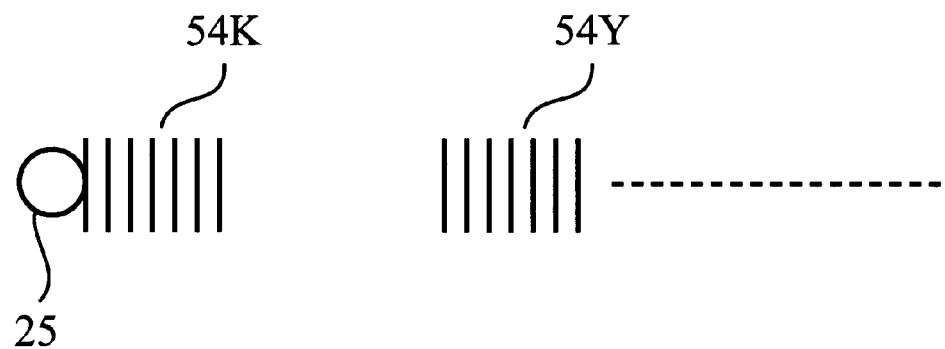
FIGS. 16(*a*) and 16(*b*) are drawings showing other examples of a pattern I.
Figure 16:

Since the pattern I exists only for the purpose of detecting the edge configuration, it need not comprise combined V shapes each comprising a CD line and an angled line as shown in FIG. 14(a). The pattern may comprise only CD lines, such as the resist marks 54Bk, 54Y . . . shown in FIG. 16(a), or even if the pattern includes angled lines, the CD lines and angled lines may be aligned continuously for each line configuration, similar to the resist marks 55Bk, 55Y shown in FIG. 16(b). Each resist mark comprises multiple identical components in order to further improve the detection accuracy through the averaging of their detection data. Further, by aligning identical lines on a continuous basis, the number of lines that can be formed in the prescribed sub scanning range can be increased, which provides the benefit that the averaging can be performed quickly and reliably to that extent.

Embodiment 3

In the Embodiment 3, while the resist marks are formed so that their profile will comprise peaked waveforms as in the Embodiments 1 and 2, the MTF correction parameters are changed based on the profile. As a result, the reproducibility of the original document image is improved.

Figure 17:
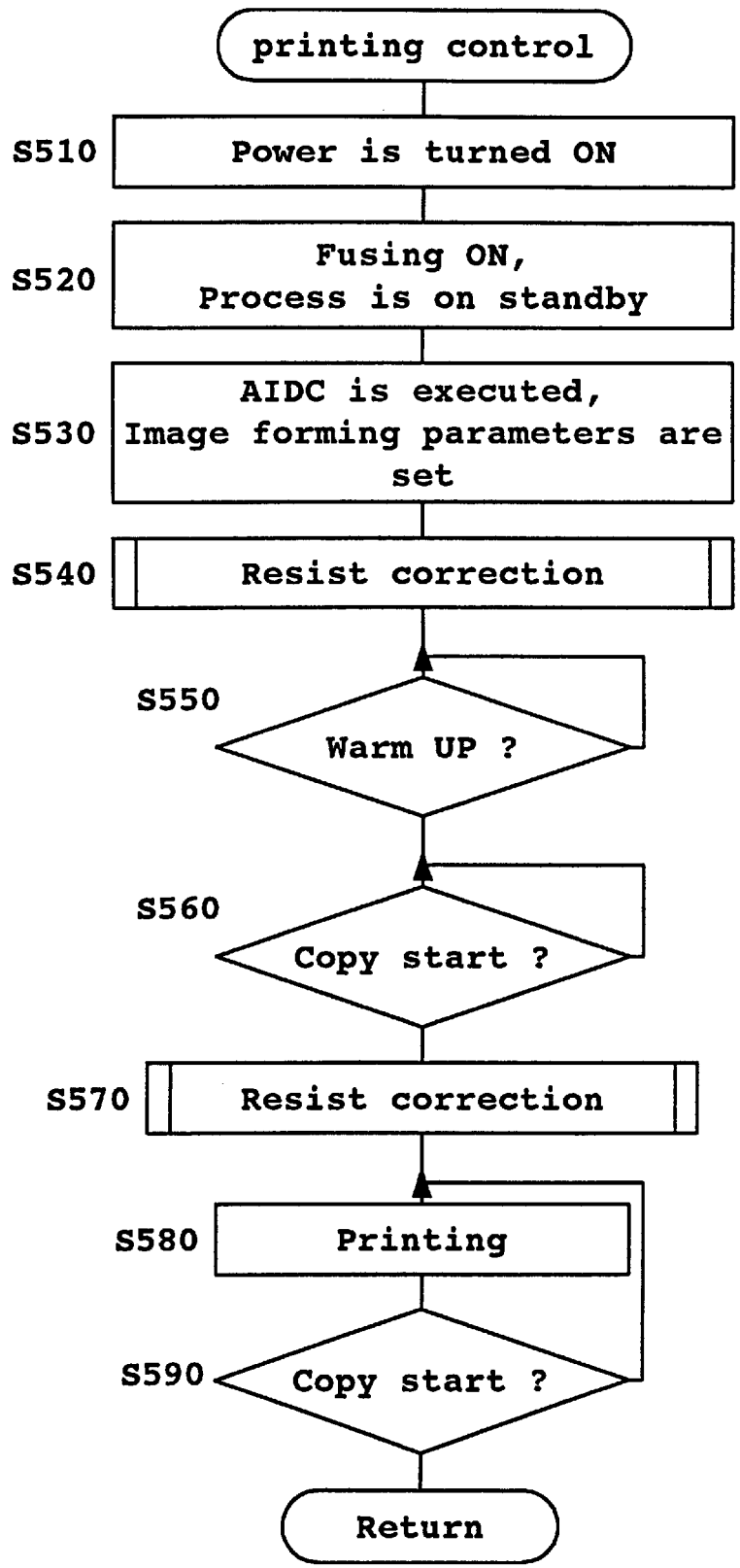
FIG. 17 is a flow chart showing the printing control in an Embodiment 3.

FIG. 17 is a flow chart showing the printing control. When power to the apparatus is turned ON, electric current is supplied to the heater of the fusing unit 19 (fusing ON), and the initial values, i.e., the grid voltage levels and the bias voltage levels, are set in the main unit controller 340 to prepare the image forming units for standby (S510, S520).

AIDC (automatic image darkness control) is then executed (S530). During AIDC, a reference patch is formed on each photoreceptor drum and the toner darkness of the reference patches is detected by means of a reflection-type photoelectric sensor (AIDC sensor) not shown in the drawings. The image forming parameters such as the grid voltage levels and the bias voltage levels are then changed based on the detection results to optimize the image darkness.

The pattern comprising the resist marks for each color is then formed on the transfer belt 10 and resist correction is performed based on the detection results of the pattern (S540).

Figure 18:
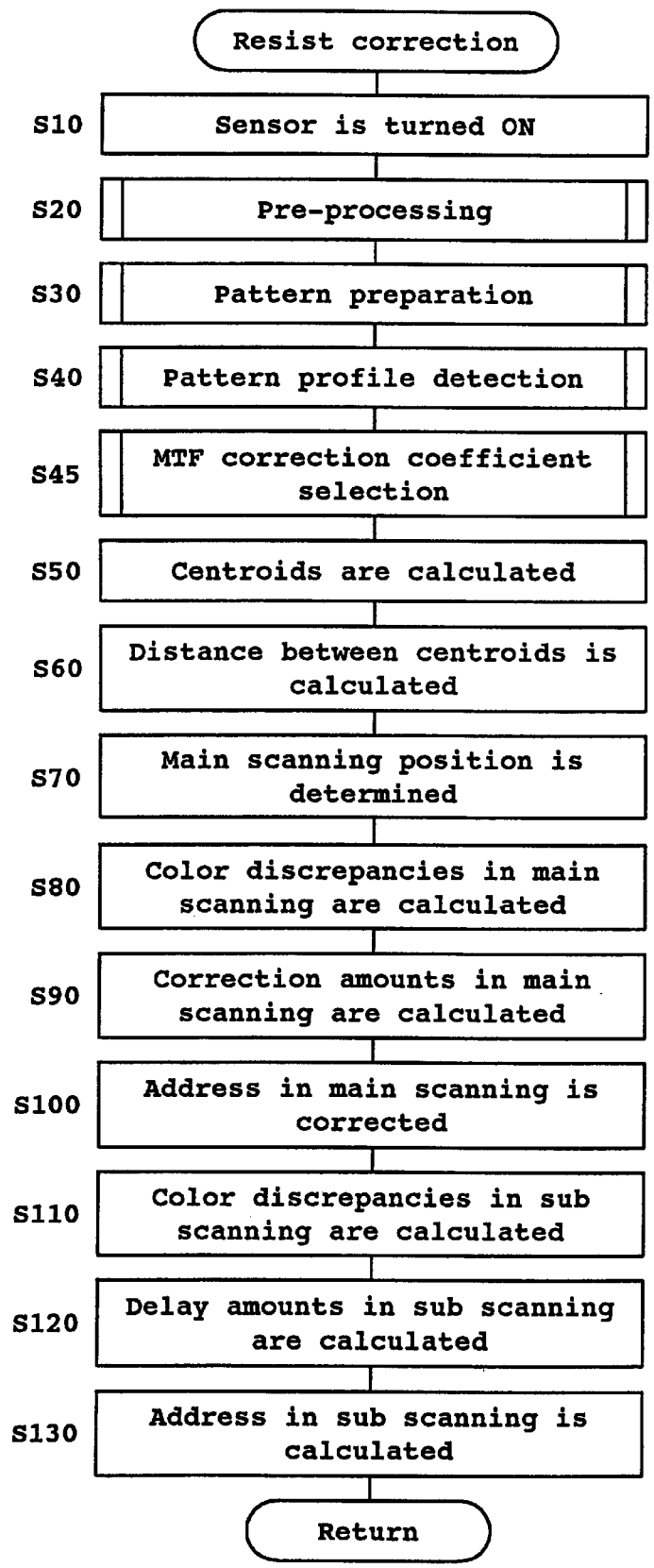
FIG. 18 is a flow chart showing the control regarding the resist correction operation.
Figure 19:
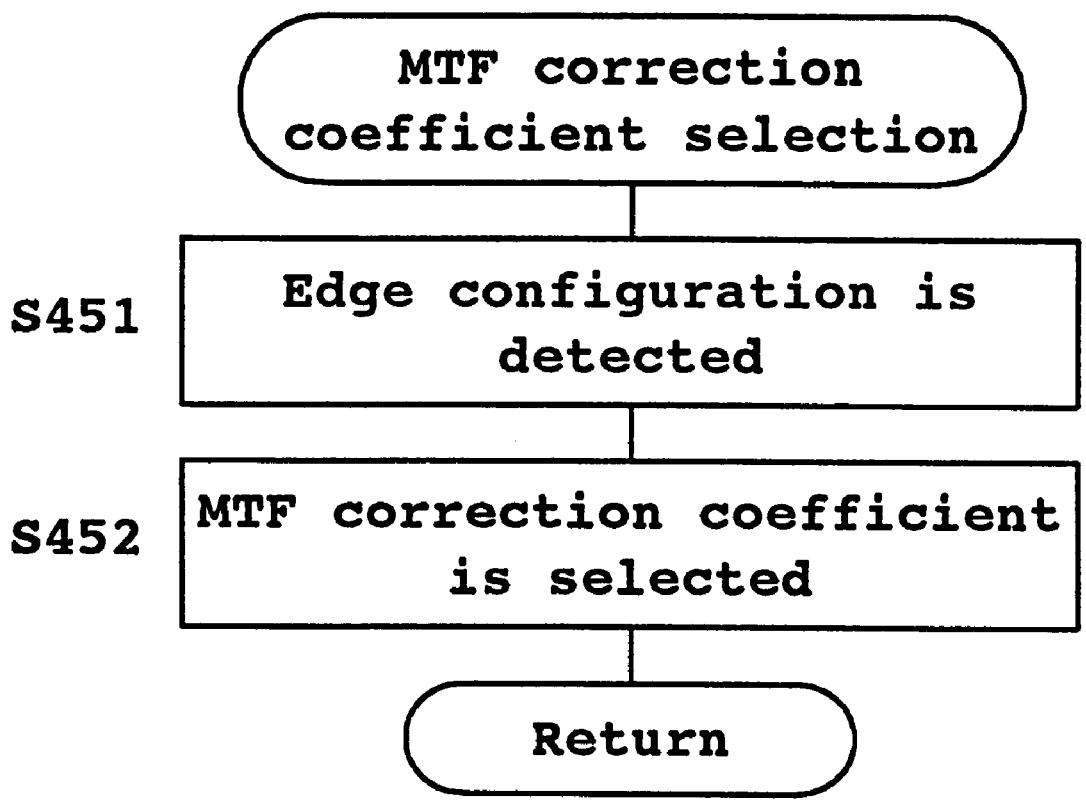
FIG. 19 is a flow chart showing the control regarding the selection of an MTF correction coefficient.

FIG. 18 is a flow chart showing the control regarding the resist correction. It differs from FIG. 7 in that a step S45 for MTF correction coefficient selection is added after the step S40.

The switch for the optical sensor unit 25 is first turned ON, and pre-processing to calibrate the sensor takes place (S10, S20). Pattern data is then prepared and the pattern is formed on the transfer belt 10 based on the data (S30).

The pattern profile (sampling waveforms) is detected by means of the optical sensor unit 25 and stored in the RAM 351 (S40). Based on the profile data thus stored, the most appropriate MTF correction coefficients for the image reproduction are selected (S45).

In the MTF correction coefficient selection process, the edge configuration of each resist mark is detected (S451), and an appropriate MTF correction coefficient is selected based on the detection result (S452).

For the determination of the edge condition, the following method may be used, for example. Detection data values that would be obtained if resist mark printing data was exactly reproduced on the transfer belt is sought in advance through a simulation or experiment. The reference data value and the actual darkness level obtained through the sampling are compared for each sampling point, and a correction coefficient that will reduce the difference is selected.

MTF correction coefficients appropriate for the various comparison results are stored in the ROM inside the MTF correction portion 311 in the form of a table.

Based on the pattern profile, the steps S50 through S130 described above are carried out to calculate the centroid position for each resist mark. The main scanning direction and sub scanning direction amounts of positional discrepancy regarding each resist mark are sought based on the centroid position information. The image data writing positions in terms of the image memory 312 are then changed, whereupon the resist correction process comes to an end. The flow chart shown in FIG. 17 is then returned to.

It is then determined in step S550 whether or not warming up has been completed. Warming up is determined to have been completed when the temperature of the fusing roller of the fusing unit 19 is determined to have reached the prescribed fusing temperature based on the output from the temperature detecting sensor (thermistor) attached to the fusing unit 19.

It is then determined whether or not the copy start key on the operation panel (not shown in the drawings) has been turned ON (S560). If it is ON, the MTF correction coefficients set in the step S540 are set in the MTF correction portion 311 (S570) such that MTF correction is performed using the MTF correction coefficients regarding the image data of the original document read by the image reader 100. Printing is then performed based on the post-correction image data (S580).

Where the original document is to be printed out multiple times (multiple copies), printing is performed until the designated number of copies is made. When printing is completed, the printing control process comes to an end, whereupon the main routine for the entire copying machine operation (not shown in the drawings) is returned to (S590). In the Embodiment 3, MTF correction was performed by selecting appropriate MTF correction coefficients. However, it is also acceptable if appropriate space filters are selected in order to perform MTF correction as in the Embodiment 2, or if MTF correction is performed using both an MTF coefficient and a space filter.

Modification

The range of the technology of the present invention is, needless to say, not limited to the embodiments described above. The following modified versions are also possible, for example.

(1) In the examples explained above, the interpolation data for the areas between the sampling points was sought and integration was performed from both ends of the waveform based on the sampled and interpolated values in order to obtain the centroid position. However, the interpolation data may be obtained for the center area only.

Since the detection waveform in the present invention comprises gentle slopes from the lowest levels to the peak, as described above, integration close to the real waveform may be performed accurately using the sampling data only, i.e., without interpolation data for the non-peak areas, i.e., the bottom areas. Therefore, even if data interpolation is carried out only for the center or peak areas, a sufficiently accurate centroid position may be obtained.

Figure 20:
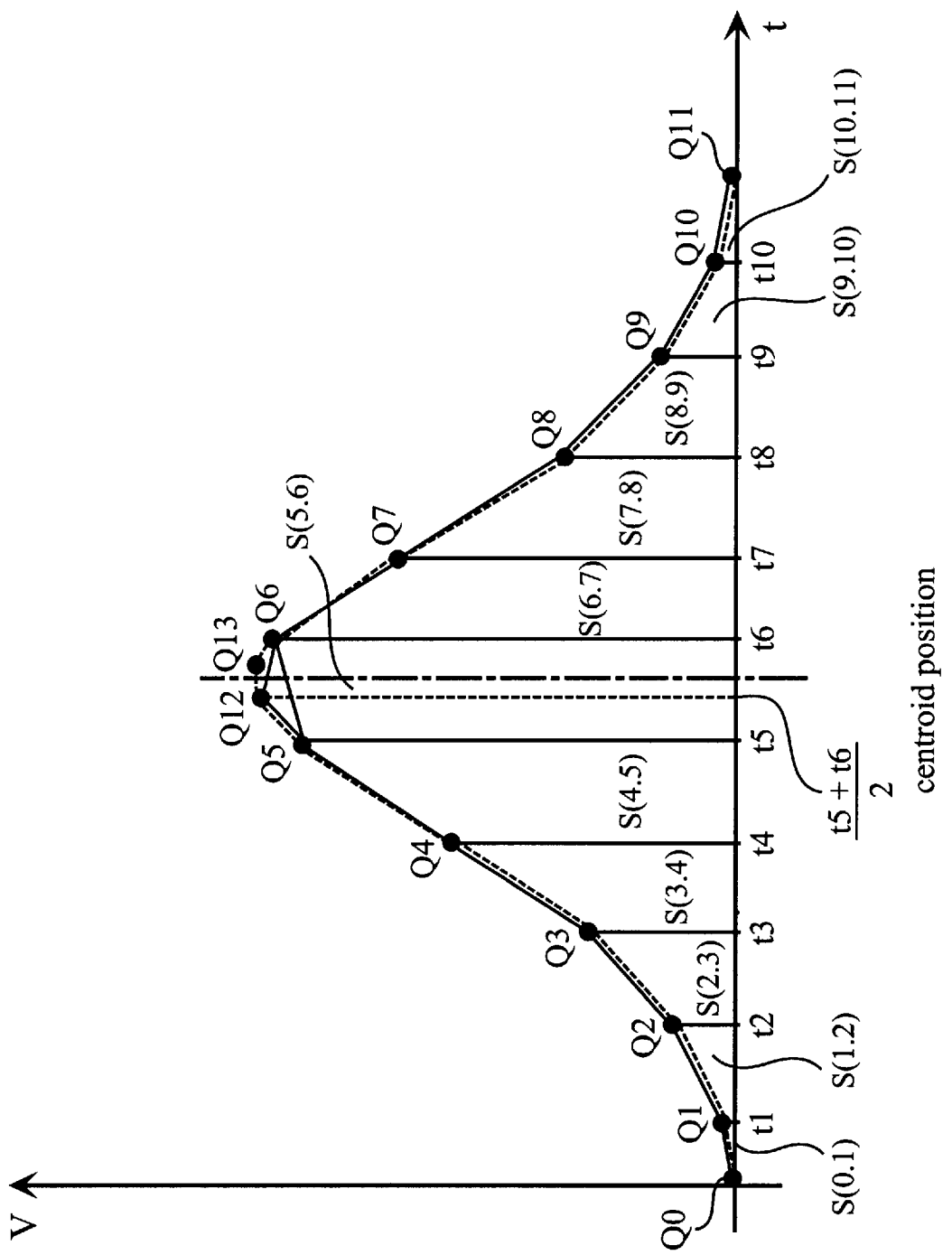
FIG. 20 is a graph to explain the method to seek the centroid position by interpolating points between sampling points.

An example of the calculation of a centroid position when a sampling waveform shown in FIG. 4(a) is obtained will be explained with reference to FIG. 20.

Here, S(3,4) means, for example, the area of the trapezoid surrounded by Q3, Q4, t4 and t3. The area of S(0,1), which is located at the left end of the peaked waveform, and the area of S(10,11), which is located at the right end of the peaked waveform, are sought. The area of the adjacent trapezoid is added to the lesser of the two, and comparison is made once more. This procedure is repeated.

Now, if the sum of the trapezoids that are located to the left of the point Qn is SLn and the sum of the trapezoids which are located to the right of the point Qn is SRn, the sum of the trapezoids to the left of the point Q6 is expressed as SL6=S(0, 1)+S(1, 2)+S(2, 3)+S(3, 4)+S(4, 5)+S(5, 6) and the sum of the trapezoids to the right of the point Q6 is expressed as SR6=S(10, 11)+S(9, 10)+S(8, 9)+S(7, 8)+S(6, 7). Because SL6 is obviously larger than SR6, as seen in the drawing as well, it is realized that the centroid is located between the point Q5 and the point Q6.

The point Q12, which is the center between the points Q5 and Q6 in the direction of the horizontal axis, is then sought using the prescribed interpolation method. For example, if the peaked waveform shown in FIG. 20 resembles a sine wave, the coordinates of the point Q12 can be calculated by substituting the coordinates of the points Q5 and Q6 in the general formula expressed as V=k×SIN(t-h) to specify the coefficients k and h, and then substituting t=(t5+t6)/2.

The integrated area SL12 to the left to the point Q12 and the integrated area SR12 to the right of said point are then sought and compared. As can also be seen from the drawing, since SL12 is smaller than SR12, it is realized that the centroid is located between the point Q12 and the point Q6. The interpolation point Q13 between these two points is then sought in the same manner, and SL13 and SR 13 are compared. Interpolation points are sequentially sought in this manner, and the location of the point Qn at which SLn equals SRn is finally deemed the centroid position.

Using this method, preparation of interpolation data can be limited to the center areas only, and therefore, the centroid position may be sought easily, quickly and accurately even using a CPU having relatively poor processing capabilities.

(2) In the embodiments described above, resist correction and MTF correction can be more reliably performed by increasing the number of resist marks formed for each color and using the average of the detection data. The distance D between the first marks of two adjacent colors should be determined considering the periodic fluctuations in the conveyance speed caused by the decentering of the drive roller, etc. In other words, where the fluctuation cycle is T and the conveyance speed is U, by making D larger than the product of U×T by a factor of two or larger integer, the detection errors caused by the periodic fluctuations may be offset or minimized by taking the average of the detection data of the multiple resist marks of the same color.

Where multiple resist marks of the same color are formed on a continuous basis, it is preferred that the sub scanning direction range of their formation be determined considering the periodic fluctuation factors of members other than the conveyance system. For example, if the periodic fluctuation is caused by the decentering of the photoreceptor drums, the resist marks should preferably be formed such that said sub scanning direction range is within a range equal to the distance integer times as large as the circumference of the photoreceptor drums. In this way, the detection errors due to the unevenness in the pitch of the resist marks caused by the decentering of the photoreceptor drums may be offset or minimized. The periodic fluctuations need not be considered with regard to the resist marks of the pattern I used for the MTF correction parameter determination in the Embodiment 2 because it is acceptable as long as the edge configuration is detected.

(3) In the embodiments described above, the resist marks were formed on one edge area of the transfer belt 10. However, it is also acceptable if the resist marks are also formed on the other edge area and the center area and optical sensor units to detect these resist marks are used, such that the amounts of positional discrepancy in the main scanning direction and sub scanning direction are detected at each location. By comparing the amounts of positional discrepancy at these three locations, the amount of bow and skew of the image can be detected. Bow correction and skew correction may be performed by calculating the relative positional discrepancy amounts among these locations.

In the embodiments described above, the amounts of relative positional discrepancy of the resist marks of other colors were calculated using the black resist mark as the reference. However, it is also possible to make correction by detecting the positional discrepancy of the black resist mark itself. In other words, by counting some signals that may be used as a reference, i.e., the clocks from the output of the resist roller drive commencement signal to the detection of the black resist mark, for example, and comparing them with the reference clocks set in advance, the positional discrepancy amount of the black resist mark in the sub scanning direction can be learned.

Other than the transfer belt, the resist marks may be transferred on a transfer medium that is conveyed on the transfer belt and detected from there.

(4) In the embodiments described above, explanations were provided using a tandem-style digital copying machine as an example. However, the present invention may be applied not only to tandem-style copying machines, but also to various other color image forming apparatuses including printers and facsimiles. Color discrepancy is not a problem in the case of a single-color image forming apparatus, but reproduction images having good linearity may be obtained by performing the bow correction and skew correction processes mentioned in paragraph (3) above.

As described above, using the copying machine of the embodiments, even if the sampling intervals are long, the waveform between the sampling points may be easily inferred. Interpolation for the data between the sampling points may be performed and an accurate centroid position may be obtained while preventing the occurrence of high-frequency noise and without compromising the accuracy.

Using the copying machine of the embodiments, the peaked waveform is set such that the ratio w1/w2 is 0.8 or smaller when the waveform width at the halfway level to the peak and the waveform width at the $1/e^2$ level relative to the peak are w1 and w2, respectively, and therefore, the waveform between the sampling points is inferred more easily.

In the copying machine of the embodiments, when the resist mark line width in the direction of the detection line is set to be no more than three times the detection width of the photoelectric sensor in the direction of the detection line, the detection signal waveforms assume peaked waveforms that meet the condition described above.

Furthermore, using the copying machine of the embodiments, when the resist marks are formed such that the darkness of the edges in the direction of the detection line is less than that of the center area, peaked waveforms that meet the condition described above are obtained.

Moreover, using the copying machine of the embodiments, the centroid position is sought by interpolating the data for areas between the sampling points in the center areas of the detection signal waveform, and an accurate centroid position may therefore be obtained even if the sampling intervals are long.

Moreover, using the copying machine of the embodiments, a test pattern is first formed on the transfer medium and MTF correction parameter values are determined based on the pattern detection results, and resist marks are formed while performing MTF correction regarding the resist mark printing data using the MTF correction parameter values determined. Therefore, the detection signal waveforms may be obtained at all times as peaked waveforms that meet the condition described above without being affected by changes in the ambient environment.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image forming apparatus comprising:

a transfer member;

a plurality of image forming units;

mark forming means for forming resist marks on the transfer member by means of the image forming units;

a sensor that detects the resist marks formed;

mark control means for controlling the mark forming means so that each mark forming means forms such resist mark that a waveform of each signal detected by the sensor comprises a peaked waveform;

detecting means for detecting positions of the peaks detected by the sensor; and image formation control means for controlling a timing at which image formation begins by the image forming units based on the peak positions detected.

2. An image forming apparatus that forms image by transferring onto an image carrier image formed by means of a image writing member, said image forming apparatus comprising:

control means for controlling the image writing member so that a resist mark is formed on a prescribed transfer medium;

a photoelectric sensor which detects the resist mark;

position information obtaining means for obtaining information regarding a position of the resist mark based on a detection signal from the photoelectric sensor; and correction means for seeking an amounts of discrepancy regarding the resist mark position based on the resist mark position information and correcting the image writing position for the image writing member, wherein a relationship between a detection width of the photoelectric sensor and a line width of the resist mark in the detection direction is set or the darkness of the resist mark in the detection direction is varied such that a waveform formed from the resist mark detection signal output by the photoelectric sensor comprises a peaked waveform having gentle slopes from the lowest levels to the peak.

3. An image forming apparatus claimed in claim 2, wherein the peaked waveform is set such that where the waveform width at ½ and $1/e^2$ of the peak output are w1 and w2, respectively, w1/w2 is 0.8 or smaller.

4. An image forming apparatus claimed in claim 2, wherein the line width of the resist mark in the detection direction is no greater than approximately three times the detection width of the photoelectric sensor in the detection direction.

5. An image forming apparatus claimed in claim 2, wherein the resist mark is formed such that a darkness of the edges in the detection direction is less than that of the center area.

6. An image forming apparatus claimed in claim 2, wherein the position information obtaining means (i) is structured such that it seeks the centroid position of the waveform formed from the resist mark detection signals and deems the centroid position to comprise the position information regarding the resist mark, and (ii) has a sampling means that samples detection signals from the photoelectric sensor at certain sampling intervals and an interpolating means that interpolates the signal output between the sampling points, such that near the center of the detection signal waveform at least, it seeks the centroid position while interpolating the signal output between the sampling points by means of the interpolating means.

7. An image forming apparatus claimed in claim 2, wherein the control means (i) controls the image writing means such that a test pattern is formed on a prescribed transfer medium, and (ii) has (a) an MTF correction parameter determining means that determines the MTF correction parameter values based on the results of the detection of the test pattern by means of the photoelectric sensor and (b) an MTF correcting means that performs MTF correction of the resist mark printing data based on the determined MTF correction parameter values, such that it controls the image writing means based on the post-MTF correction printing data so that the resist marks will be formed.

8. A method to correct an image writing positions in an image forming apparatus that forms image by transferring onto an image carrier the image formed by means of an image writing member, said method comprising the steps of:

a resist mark preparation step in which resist mark is formed on a prescribed transfer medium through control of the image writing member;

a detection step in which the resist mark is detected by a photoelectric sensor;

a position information obtaining step in which a position information regarding the resist mark is obtained based on the detection signals from the photoelectric sensor; and a correction step in which a amounts of positional discrepancy regarding the resist mark is sought based on the resist mark position information, and the image writing position for the image writing member is corrected, wherein in the resist mark preparation step, the resist mark is formed so that a waveform formed from the resist mark detection signal output from the photoelectric sensor comprise peaked waveform having gentle slopes from the lowest levels to the peak.

9. An image writing position correction method claimed in claim 8, wherein the resist mark preparation step comprises (i) a test pattern preparation step in which the image writing member is controlled such that a test pattern is formed on a prescribed transfer medium and (ii) an MTF correction step in which (a) MTF correction parameter values are determined based on the results of detection of the test pattern by means of the photoelectric sensor, and (b) MTF correction of the resist mark printing data is performed, and in which the image writing member is controlled based on the post-MTF correction printing data so that the resist mark is formed.

* * * * *